US009934285B1

(12) United States Patent
Rehling et al.

(10) Patent No.: US 9,934,285 B1
(45) Date of Patent: *Apr. 3, 2018

(54) METHOD AND APPARATUS FOR CONCEPT-BASED CLASSIFICATION OF NATURAL LANGUAGE DISCOURSE

(71) Applicant: NetBase Solutions, Inc., Santa Clara, CA (US)

(72) Inventors: John Andrew Rehling, San Francisco, CA (US); Michael Jacob Osofsky, Palo Alto, CA (US)

(73) Assignee: NetBase Solutions, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/747,810

(22) Filed: Jun. 23, 2015

Related U.S. Application Data

(63) Continuation of application No. 13/286,799, filed on Nov. 1, 2011, now Pat. No. 9,063,970, which is a continuation of application No. 11/420,782, filed on May 29, 2006, now Pat. No. 8,055,608.

(51) Int. Cl.
*G06F 17/30* (2006.01)

(52) U.S. Cl.
CPC .... *G06F 17/3053* (2013.01); *G06F 17/30401* (2013.01)

(58) Field of Classification Search
USPC .................................................. 707/705, 706
See application file for complete search history.

(56) References Cited

U.S. PATENT DOCUMENTS

| 5,694,523 A | 12/1997 | Wical |
| 5,794,050 A | 8/1998 | Dahlgren et al. |
| 5,940,821 A | 8/1999 | Wical |

(Continued)

OTHER PUBLICATIONS

Wu, Tianhaow et al., published May 3, 2003 (y/m/d), 12 pgs. "A Supervised Learning Algorithm for Information Extraction From Textual Data," Proceedings of the Workshop on Text Mining, Third SIAM International Conference on Data Mining.

(Continued)

*Primary Examiner* — Kim Nguyen
(74) *Attorney, Agent, or Firm* — Kaplan IP Law, PLLC; Jonathan T. Kaplan

(57) ABSTRACT

Pinnacle concepts are not amenable to detection by the use of keywords. A unit of natural language discourse (UNLD) "refers" to a pinnacle concept "C" when that UNLD uses linguistic expressions in such a way that "C" is regarded as expressed, used or invoked by an ordinary reader of "L." A reference can have a "reference level" value that is proportional to: the "strength" with which the pinnacle concept is referenced, the probability that a pinnacle concept is referenced or both strength and probability. Pinnacle concepts can be divided into Quantifiers and non-Quantifiers. A Quantifier can modify the reference level assigned to a non-Quantifier. A concept "C," that is determined to be referenced by a UNLD "x," after application of its Quantifiers, is said to be asserted by "x." Concept-based classification is the identification of whether a pinnacle concept "C" is asserted by a UNLD. Concept-based classification can be used for concept-based search.

2 Claims, 41 Drawing Sheets

(56) References Cited

U.S. PATENT DOCUMENTS

| | | | |
|---|---|---|---|
| 5,963,940 | A | 10/1999 | Liddy et al. |
| 5,995,922 | A | 11/1999 | Penteroudakis et al. |
| 6,012,053 | A | 1/2000 | Pant et al. |
| 6,202,064 | B1 | 3/2001 | Julliard |
| 6,269,356 | B1 | 7/2001 | Hatton |
| 6,278,967 | B1 | 8/2001 | Akers et al. |
| 6,453,312 | B1 | 9/2002 | Goiffon et al. |
| 6,560,590 | B1 | 5/2003 | Shwe et al. |
| 6,571,240 | B1 | 5/2003 | Ho |
| 6,578,022 | B1 | 6/2003 | Foulger et al. |
| 6,584,464 | B1 | 6/2003 | Warthen |
| 6,671,723 | B2 | 12/2003 | Nguyen et al. |
| 6,675,159 | B1 | 1/2004 | Lin et al. |
| 6,738,765 | B1 | 5/2004 | Wakefield et al. |
| 7,028,026 | B1 | 4/2006 | Yang et al. |
| 7,302,383 | B2 | 11/2007 | Valles |
| 7,356,540 | B2 | 4/2008 | Smith et al. |
| 7,496,593 | B2 * | 2/2009 | Gardner ............... G06F 17/279 |
| 7,593,932 | B2 * | 9/2009 | Lindh ............... G06F 17/30607 |
| 7,805,302 | B2 | 9/2010 | Chelba et al. |
| 8,055,608 | B1 * | 11/2011 | Rehling ............ G06F 17/30684 704/1 |
| 8,131,540 | B2 | 3/2012 | Marchisio et al. |
| 8,162,125 | B1 * | 4/2012 | Csulits ............... G07D 7/0033 194/206 |
| 8,225,374 | B2 * | 7/2012 | Aoki ............... G06Q 30/0281 705/319 |
| 8,316,040 | B2 * | 11/2012 | Guha ............... G06F 17/30672 707/759 |
| 8,452,746 | B2 * | 5/2013 | Guha ............... G06F 17/30864 707/706 |
| 2002/0091671 | A1 | 7/2002 | Prokoph |
| 2003/0172061 | A1 | 9/2003 | Krupin et al. |
| 2003/0216905 | A1 | 11/2003 | Chelba et al. |
| 2004/0044952 | A1 | 3/2004 | Jiang et al. |
| 2004/0078190 | A1 | 4/2004 | Fass et al. |
| 2005/0149494 | A1 | 7/2005 | Lindh et al. |
| 2005/0165600 | A1 | 7/2005 | Kasravi et al. |
| 2007/0156677 | A1 | 7/2007 | Szabo |

OTHER PUBLICATIONS

Zadrozny, Slawomir et al., published 2003, 5 pgs. "Linguistically quantified thresholding strategies for text categorization," Systems Research Institute, Polish Academy of Sciences, Warszawa, Poland.

Cardie et al., published Mar. 24, 2003, 8 pages. "Combining Low-Level and Summary Representations of Opinions for Multi-Perspective Question Answering," AAAI Technical Report (Spring Symposium) SS-03-07.

\* cited by examiner

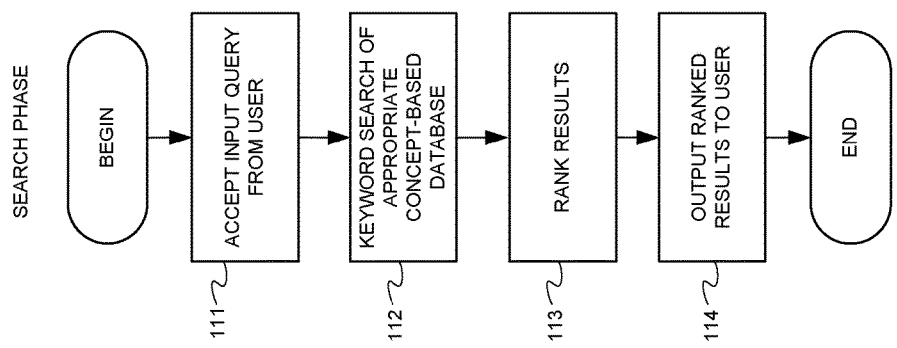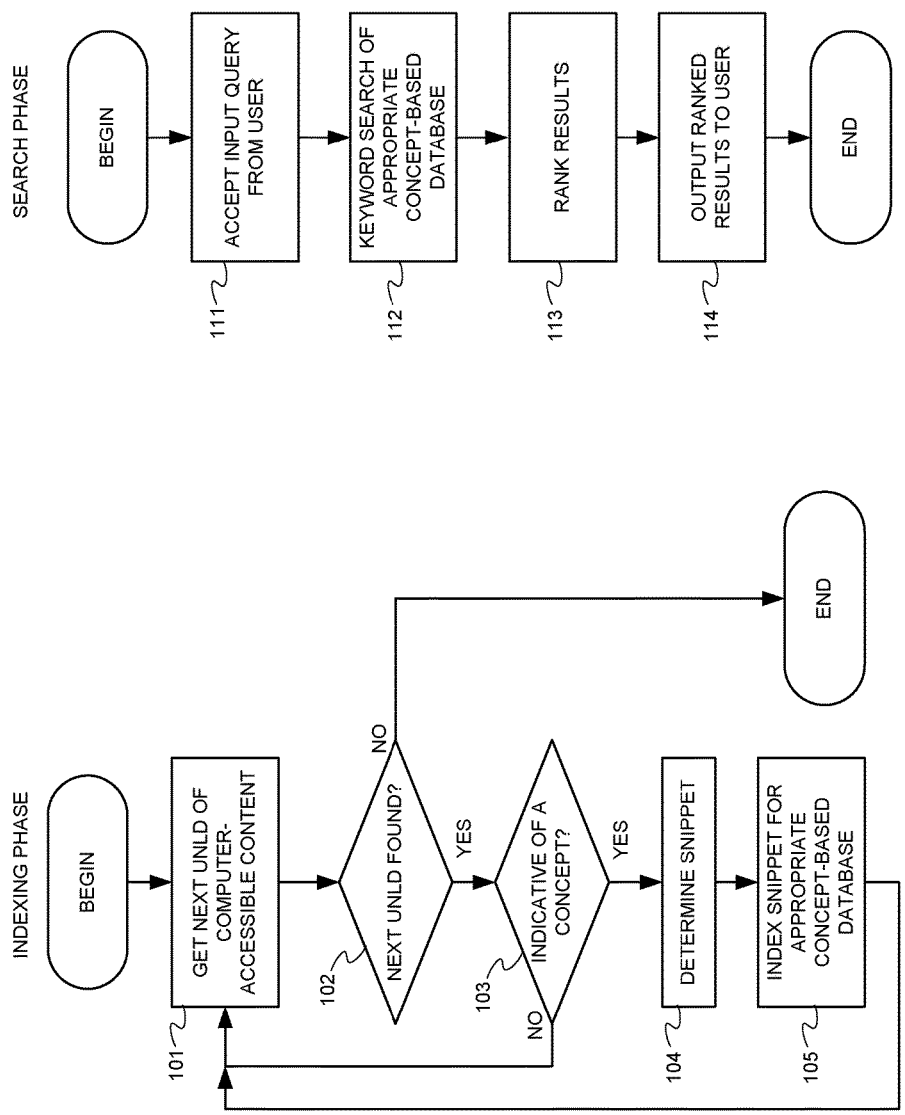

CONCEPT AND KEYWORD BASED SEARCH OF COMPUTER-ACCESSIBLE CONTENT

CLASSIFICATION OF A UNIT OF NATURAL LANGUAGE DISCOURSE (UNLD)

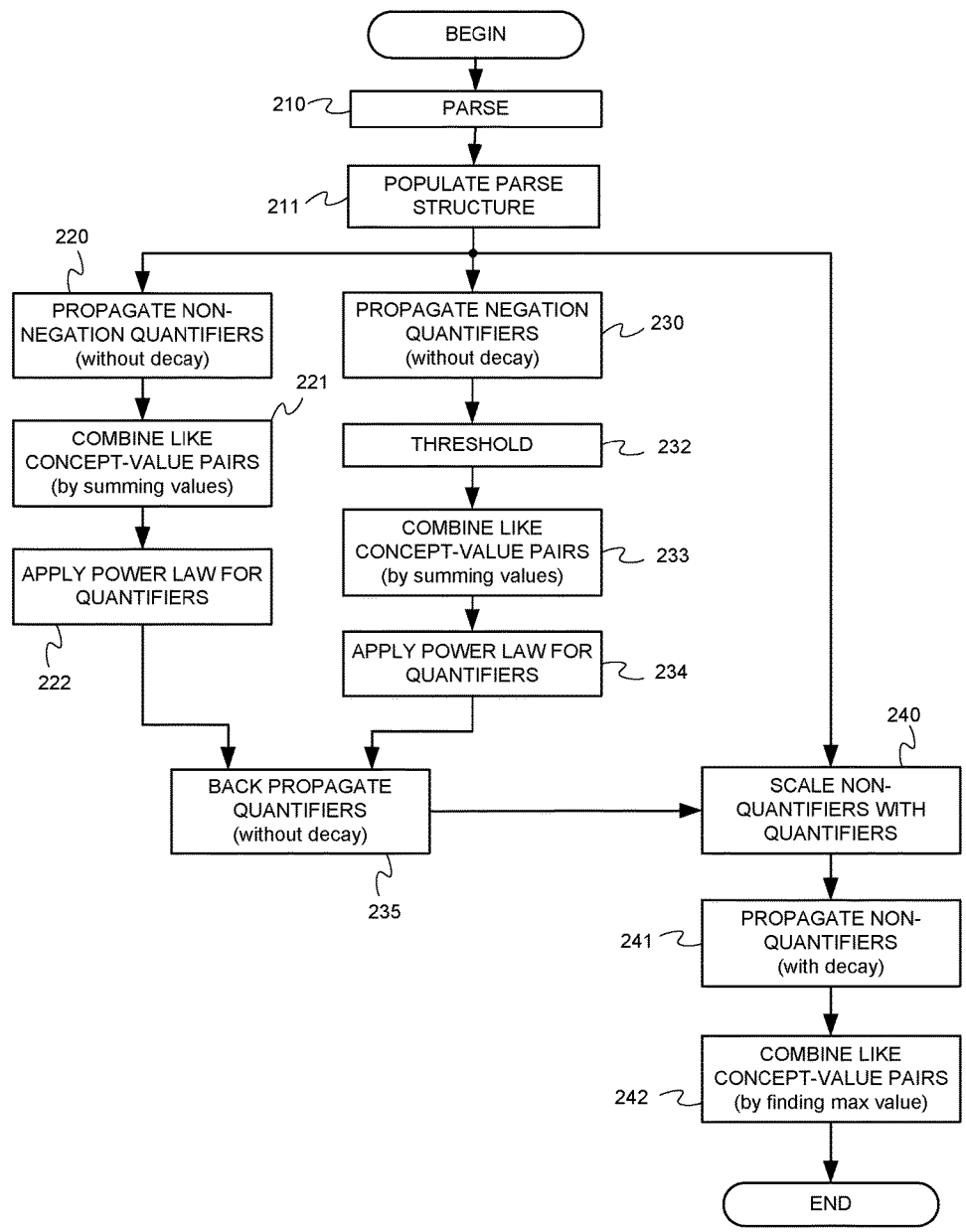

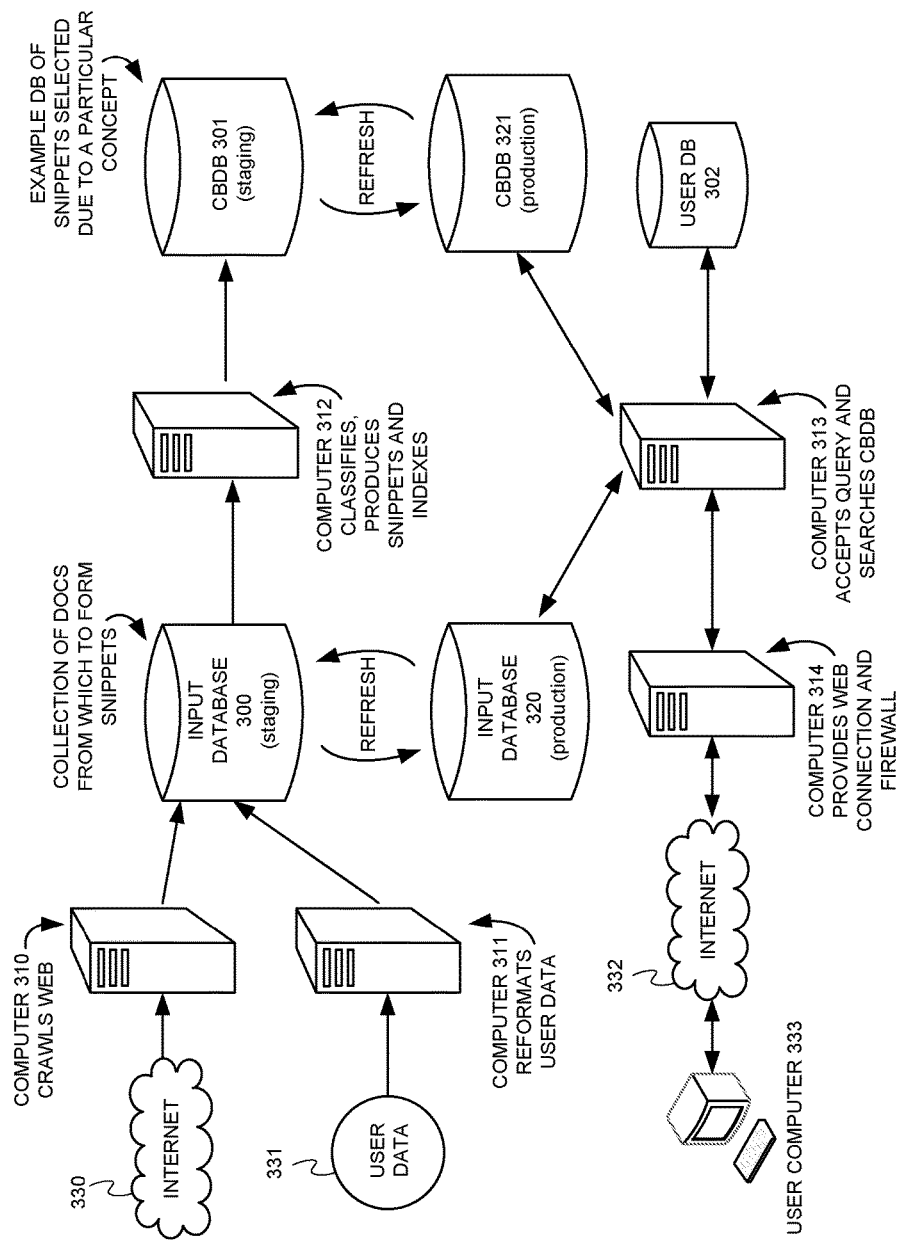

Figure 4
Indexing

```
1   for each document, "D_curr," of an input database {
2     for each sentence, "S_curr," of D_curr {
3       /* sentence_classify receives a sentence "S_curr" as input and returns parse results whose nodes are coded with concept-value
4       pairs. The level of sentence structural information represented by each node can be, for example, a lexical unit. The value
5       portion, of each concept-value pair "p," indicates a reference level at which the pinnacle concept of "p" is referenced by, at least,
6       the portion of S_curr represented by the node to which it is attached. Each reference level is a real number in the range 0 to 1. */
7       result_parse = sentence_classify(S_curr);
8
9       /* One approach, to determining whether a sentence, S_curr, is to be added to a CBDB whose organizing concept is PC_curr, is
10      as follows. Add S_curr if PC_curr, for at least one of the nodes in the parse results, exceeds a certain threshold (e.g., 0.4 on a
11      scale of 0.0 to 1.0). */
12      for each pinnacle concept, "PC_curr," that is an organizing conept of a CBDB {
13        for each node unit, "NU_curr," represented in the result_parse {
14          RL_value = access NU_curr to find reference level value assigned for concept PC_curr;
15          if (RL_value above a certain threshold) {
16            /* To the extent possible, determine a snippet, "snippet_curr," that includes S_curr. For example,
17            snippet_curr can comprise 5 sentences with S_curr as its central sentence. */
18            determine a snippet, "snippet_curr," centered about S_curr;
19
20            /* The parse and classification results, determined separately for each sentence of snippet_curr, can be
21            saved with snippet_curr prior to its addition to the CBDB for PC_curr. Specifically, it is assumed that, at
22            this point, the individual parse results, for each sentence of snippet_curr, is available. Then, for each
23            sentence "s" of snippet_curr, its parse results can be stored with "s." Such storage, of parse and
24            classification results, acts as a cache that can increase the efficiency of the ranking phase. */
25            cache parse and classification results, at least for those results relating to
26            PC_curr, with each sentence of snippet_curr;
27
28            add snippet_curr to the CBDB organized around PC_curr;
29          }
30        } /* end "for each NU_curr */
31      } /* end "for each PC_curr */
32    }
33  } /* end "for each S_curr */
34 } /* end "for each D_curr */
```

Figure 5A
Query Accepting

```
1  /* In this step, an input query is accepted from a user. The query can express a keyword search. Additional concept-sensitive properties can be
2  added to a keyword. The concept-sensitive properties can be used in a ranking phase. Marking a keyword with a concept-sensitive can be
3  referred to as "coloring" the keyword.
4  */
5  Accept a user selection, "CBDB_curr," of the CBDB in which IQ_curr is to be searched;
6
7  Accept an Input Query, "IQ_curr," from a user;
```

Figure 5B
Keyword-Based Searching

1  /* It may be necessary to convert IQ_curr to a format accepted by the keyword search engine */
2  */
3  Convert IQ_curr into an input, IQ_curr_logical, formatted for a known keyword search engine;
4
5  /* Apply IQ_curr_logical to a keyword search engine that searches CBDB_curr
6  */
7  logically_scored_snippets = keyword_search_engine(CBDB_curr, IQ_curr_logical);
8
9  /* Snippets from phase 3 ("Keyword-Based Searching") can be re-ranked, according to decreasing snippet score, and displayed to user. */
10 Display logically_scored_snippets ranked according to decreasing snippet_score;

Figure 5C
Concept-Based Ranking

```
1   /* This loop gives each snippet, found by the keyword-based search engine, a "snippet score" so that results of phase 3 ("Keyword-Based
2      Searching") can be better ranked. */
3   for each snippet, "snippet_curr," of logically_scored_snippets {
4       /* This loop, to apply sentence_classify to each sentence of snippet_curr, is only needed if such classification information has not been
5       cached during indexing
6       */
7       for each sentence, "S_curr," of snippet_curr {
8           result_parse = sentence_classify(S_curr);
9           store result_parse with S_curr;
10      } /* end "for each S_curr */
11
12      QS = query_score(snippet_curr, IQ_curr);
13
14      /* The naturalness metric is intended to give low score to a snippet which, according to a crude test, appears not to be prose written in a
15      natural language. For example, want to filter out, from presentation to user, those snippets intended for reading by a machine and would
16      not be useful to a user of the concept-based search tool. The naturalness metric can be based upon whether any words, of the 25 most
17      frequently occurring words of the the natural language at issue, are present. For English, an example of one of the 25 most frequently
18      occurring words is "the." While score has a range of 0 to 1, it is, essentially, as pass/fail test.
19
20      NS is independent of user input and could be stored in the concept-based database during indexing.
21      */
22      NS = naturalness_score(snippet_curr);
```

Figure 5D
Ranking (cont)

```
1   /* General idea the length appropriateness (LA) metric is to filter out, from presentation to user, those snippets based on text intended for
2   reading by a machine and would not be useful to a user of the concept-based search tool.  Give low score to a snippet with a sentence or
3   sentences whose length is far too long to be a sentence of a natural language (e.g., English).  For example, a web page full of menus, a
4   snippet of which a user would not want to review, could likely lack a period and therefore appear as an enormously long sentence.  Can
5   also give a low score if snippet has a multiple sentences whose length is too short to be written in the natural language at issue.  Score
6   has a range of 0 to 1.
7
8   LA is independent of user input and could be stored in the concept-based database during indexing.
9   */
10  LA = length_appropriateness_score(snippet_curr);
11
12  snippet_score = NS * LA * QS;
13
14  assign snippet_score to snippet_curr;
15
16  } /* end "for each snippet_curr */
```

Figure 6A

```
1    /* Process for determining non-Quantifier concept values asserted by a sentence "S." */
2    sentence_classify(S) {
3    
4    Parse "S" into a parse structure "T;" /* Any known parser can be used */
5    
6    /* The below pseudo-code accomplishes population, of the nodes of a parse structure, with initial values for the non-Quantifier and Quantifier
7    concepts. Each value populated is represented as a concept-value pair, where the concept is a non-Quantifier or Quantifier concept and the value
8    is a reference level. For this example, each parse structure node represents a lexical unit of "S," but other levels, of parse representation, can be
9    used.
10   */
11   LF_list = determine linguistic features of "S;"
12   For each linguistic feature "LF_curr" of LF_list {
13       /* The Semantic Units (SUs), for the each linguistic feature of "S," can be determined by a look-up in a Concept Feature DB (CFDB). */
14       SU_list = determine SUs for LF_curr in a CFDB;
15   
16       /* Two main types of concept-value pairs can be assigned to a parse structure node, depending on whether the SU's Concept Label (CL)
17       specifies a Quantifier or non-Quantifier concept. */
18       For each SU_curr of SU_list {
19           NU_curr = node unit of parse structure indicated by SRL of SU_curr;
20           CL_curr = CL of SU_curr;
21           RLI_curr = Reference Level Indicator or RLI of SU_curr;
22   
23           /* Assign a concept-value pair to the applicable parse structure node. */
24           assign to NU_curr a concept-value pair comprised of CL_curr and RLI_curr;
25       } /* end "for each SU_curr */
26   } /* end "for each LU_curr */
```

Figure 6B

```
1   /* Rules for concept-value pair propagation where the concept is of type Quantifier:
2   1. The propagation of each concept-value pair is kept separate.
3
4   2. Concept-value pairs only propagate across the following types of links of "T."
5        From an Agent --> to its Verb
6        From a Patient --> to its Verb
7        From a Modifier --> to what is Modified
8
9   3. The value portion, of each concept-value pair, does not decay. */
10  Propagate Quantifier values through "T;"
11
12  /* Remove all Quantifier concept-value pairs that are not at a governing node. */
13  For each non-governing node "n" of "T" {
14      For each concept-value pair "p" at "n" {
15          if ("p" is a Quantifier concept-value pair)
16              delete "p;"
17      }
18  }
19
20  /* Sum values, for non-negation Quantifiers, on a per-concept basis. */
21  For each governing node "n" of "T" {
22      For each type of non-negation Quantifier "NNQ_type" of node "n" {
23          sum1 = 0;
24          For each non-negation Quantifier concept-value pair "NNQ_cvp" of type "NNQ_type" at node "n" {
25              sum1 = sum1 + NNQ_cvp(value);
26              delete NNQ_cvp from "n;"
27          }
28          add a concept-value pair to "n" with concept "NNQ_type" and value sum1;
29      }
30  }
```

Figure 6C

```
1   /* Apply Power Law for Quantifiers (PLQ) to value portion of concept-value pairs where concept is of type non-negation Quantifier. */
2   For each governing node "n" of "T" {
3       For each non-negation Quantifier concept-value pair "NNQ_cvp" at node "n" {
4           exponent = value portion of NNQ_cvp;
5           base = value based on NNQ_type;
6           new_value = base raised to exponent;  /* This line applies PLQ */
7           replace value portion, of NNQ_cvp, with new_value;
8       }
9   }
10  /* Thresholding value portion of each negation Quantifier concept value pair. */
11  For each governing node "n" of "T" {
12      For each negation Quantifier concept-value pair "NQ_cvp" of node "n" {
13          current_value = value portion of NQ_cvp;
14          thresholded_value = current_value thresholded to 0 or 1;
15          replace value portion, of NQ_cvp, with thresholded_value;
16      }
17  }
18  /* Sum values for each type of negation Quantifier. */
19  For each governing node "n" of "T" {
20      For each type of negation Quantifier "NQ_type" of node "n" {
21          sum1 = 0;
22          For each negation Quantifier concept-value pair "NQ_cvp" of type "NQ_type" at node "n" {
23              value1 = value portion of NQ_cvp;
24              sum1 = sum1 + value1;
25              delete NQ_cvp from "n;"
26          }
27          add a concept-value pair to "n" with concept "NQ_type" and value sum1;
28      }
29  }
```

Figure 6D

```
1   /* Apply Power Law for Quantifiers (PLQ) to value portion of concept-value pairs where concept is of type negation Quantifier. */
2   For each governing node "n" of "T" {
3       For each negation Quantifier concept-value pair "NQ_cvp" at node "n" {
4           exponent = value portion of NQ_cvp;
5           base = value based on concept portion of NQ_type;
6           new_value = base raised to exponent;   /* This line applies PLQ */
7           replace value portion, of NQ_cvp, with new_value;
8       }
9   }
10
11  /* Rules for concept-value pair back-propagation where the concept is of type Quantifier:
12  1. The propagation of each concept-value pair is kept separate.
13
14  2. Concept-value pairs only propagate across the following types of links of "T:"
15         From a Verb --> to its Agent
16         From a Verb --> to its Patient
17         From a Modified node --> to its Modifier(s)
18
19  3. The value portion, of each concept-value pair, does not decay. */
20  Back-Propagate Quantifier values through "T;"
```

Figure 6E

```
1   /* Scale Non-Quantifier Values With Quantifier Values. */
2   For each node "n" of "T" {
3   
4       solution_scaling_factor = 1;
5       For each concept-value pair "Q_cvp" where concept is any type of Quantifier {
6           Q_value_portion = Q_cvp(value);
7           solution_scaling_factor = solution_scaling_factor * Q_value_portion;
8       }
9   
10      general_scaling_factor = 1;
11      For each concept-value pair "Q_cvp" where concept is any type of Quantifier except for "Solution" {
12          Q_value_portion = Q_cvp(value);
13          general_scaling_factor = general_scaling_factor * Q_value_portion;
14      }
```

Figure 6F

```
1   For each concept-value pair "NQ_cvp" of "n" where concept is any type of non-Quantifier {
2
3       if (concept of NQ_cvp is "Bad")
4           scaling_factor = solution_scaling_factor;
5       else
6           scaling_factor = general_scaling_factor;
7
8       NQ_value_portion = value portion of NQ_cvp;
9       scaled_value_portion = scaling_factor * NQ_value_portion;
10      replace value portion, of NQ_cvp, with scaled_value_portion;
11
12      if (scaled_value_portion < 0) {
13          replace value portion, of NQ_cvp, with its absolute value;
14          replace concept "C," of NQ_cvp, with its corollary concept "-C" ;
15
16          if ( ((concept of NQ_cvp == "Bad") AND (general_scaling_factor > 0)) OR
17               ((concept of NQ_cvp == "Good") AND (solution_scaling_factor > 0)) )
18          {
19              pe_NQ_cvp = pre-existing concept-value pair for "-C";
20              pe_value_portion = value portion of pe_NQ_cvp;
21              NQ_value_portion = get value portion of NQ_cvp;  /* gets absolute value of scaled_value_portion */
22
23              if (NQ_value_portion > pe_value_portion)
24                  delete pe_NQ_cvp from node "n" ;
25              else
26                  delete NQ_cvp from node "n" ;
27          }
28      }
29
30  } /* end looping over each node "n" of "T" */
```

Figure 6G

```
1   /* Rules for non-Quantifier value propagation:
2   1. The propagation of each concept-value pair is kept separate.
3   
4   2. Concept-value pairs propagate across any links.
5   
6   3. The value portion, of each concept-value pair, decays.
7   */
8   Propagate non-Quantifier values through "T;"
9   
10  /* Selecting maximum of the non-Quantifier concept-value pairs. */
11  For each "n" node of "T" {
12      For each type of non-Quantifier "NQ_type" of node "n" {
13          max1 = 0;
14          For each non-Quantifier concept-value pair "NQ_cvp" of type "NQ_type" at node "n" {
15              max1 = find_max( max1, NQ_cvp(value) );
16              delete NQ_cvp from "n;"
17          }
18          add a concept-value pair to "n" with concept "NQ_type" and value max1;
19      }
20  }
21  
22  return T;
23  
24  } /* end "sentence_classify" */
```

Figure 7A

```
1  query_score(snippet2score, input_query)
2  {
3    for each query term, "QT_curr," of input_query that does not require its keywords to be absent from a matching
4    snippet {
5      QT_curr(concept) = pinnacle concept, indicated as a concept-sensitive property for QT_curr;
6      QT_curr(instances) = set of occurrences of QT_curr in snippet2score;
7      requirement_status = requirement status of QT_curr;
8
9      /* Rule 1: */
10     if ( (QT_curr(concept) ≠ NONE) AND
11     (for at least one instance "i" of QT_curr(instances), the sub-unit of snippet2score, in which "i" occurs, has
12     been classified as asserting, with sufficient reference level, the concept specified by QT_curr(concept) ) )
13         QT_curr(coefficient) = 1.0;
14
15     /* Rule 2: */
16     if ( (QT_curr(concept) == NONE) AND
17     (QT_curr(instances) is not empty) )
18         QT_curr(coefficient) = 1.0;
19
20     /* Rule 3: */
21     if ( (QT_curr(concept) ≠ NONE) AND
22     (for at least one instance "i" of QT_curr(instances), the sub-unit of snippet2score, in which "i" occurs, has
23     been classified as not asserting any pinnacle concepts)
24         QT_curr(coefficient) = 0.1;
25
26     /* Rule 4: */
27     if (QT_curr(instances) == empty)
28         QT_curr(coefficient) = 0.0;
29
```

Figure 7B

```
1   /* Rule 5: this type of match is given a non-zero value simply to cover the possibility that it is the best match found. Typically, this type of
2   match will be at the bottom of the list given to user. */
3   if ( (QT_curr(concept) ≠ NONE) AND
4   (for at least one instance "i" of QT_curr(instances), the sub-unit of snippet2score, in which "i" occurs, has
5   been classified as asserting, with sufficient reference level, the correlative pinnacle concept specified by
6   QT_curr(concept) ) )
7           QT_curr(coefficient) = 0.001;
8
9   /* Rule 6: guarantees that an optional query term receives a nonzero coefficient value even if it has no matches in snippet2core. This
10  ensures that a zero value for QS will not result simply because an optional term has no matches. */
11  if (requirement_status == "Optional")
12          QT_curr(coefficient) = 0.001 + QT_curr(coefficient) * 0.999;
13
14  } /* end "for each QT_curr" */
15
16  /* Utilize coefficient values to determine a score for the snippet. An example approach is to find the product of the scores assigned to the query
17  terms. */
18  QS = 1;
19  for each query term, "QT_curr," of input_query that does not require its keywords to be absent from a matching
20  snippet {
21          QS = QS * QT_curr(coefficient);
22  } /* end "for each QT_curr" */
23
24  return QS;
25
26  } /* end "query_score" */
```

FIGURE 8A
EXAMPLE QUERY

Enter Search Terms:

QUERY TERM 810:
KEYWORD SPECIFICATION: electricity, battery/n
REQUIREMENT STATUS: Required QUERY TERM 811:
KEYWORD SPECIFICATION: burn/v out, out of power
REQUIREMENT STATUS: Required QUERY TERM 812:
KEYWORD SPECIFICATION: last/v
REQUIREMENT STATUS: Required QUERY TERM 813:
KEYWORD SPECIFICATION: portable, hand-held
REQUIREMENT STATUS: Optional

BACK  NEXT

PAGE 800

FIGURE 8B
EXAMPLE QUERY

Enter Search Terms:

PAGE 801

BACK    NEXT

QUERY TERM 820:

| KEYWORD SPECIFICATION: | REQUIREMENT STATUS: | CONCEPT PROPERTY: |
|---|---|---|
| electricity, battery//n | Required | NONE |

QUERY TERM 821:

| KEYWORD SPECIFICATION: | REQUIREMENT STATUS: | CONCEPT PROPERTY: |
|---|---|---|
| burn//v out, out of power | Required | Bad |

QUERY TERM 822:

| KEYWORD SPECIFICATION: | REQUIREMENT STATUS: | CONCEPT PROPERTY: |
|---|---|---|
| last//v | Required | Good |

QUERY TERM 823:

| KEYWORD SPECIFICATION: | REQUIREMENT STATUS: | CONCEPT PROPERTY: |
|---|---|---|
| portable, hand-held | Optional | NONE |

FIGURE 8C

Check concept-oriented databases that apply:

☒ Market Needs

Market Needs is for researching needs in a market, finding new applications, early adopters, and customers for a technology, or for identifying competitors' weakness.

☐ Market Claims

Market Claims is for researching competitors and alternative solutions, identifying infringers, or finding innovations that solve critical problems.

[BACK]  [NEXT]

SCREEN 802

FIGURE 8D
EXAMPLE EMTPY FORM FOR QUERY ENTRY

Enter Search Terms:

PAGE 803

[BACK] [NEXT]

QUERY TERM 820:
KEYWORD SPECIFICATION:     REQUIREMENT STATUS:     CONCEPT PROPERTY:

QUERY TERM 821:
KEYWORD SPECIFICATION:     REQUIREMENT STATUS:     CONCEPT PROPERTY:

QUERY TERM 822:
KEYWORD SPECIFICATION:     REQUIREMENT STATUS:     CONCEPT PROPERTY:

QUERY TERM 823:
KEYWORD SPECIFICATION:     REQUIREMENT STATUS:     CONCEPT PROPERTY:

FIGURE 8E
EXAMPLE SEARCH RESULTS

SCREEN 804

Snippets 1 - 2 of 221:   [BACK]   [NEXT]

SNIPPET 830:

1. The batteries should only be replaced with regular duty non-alkaline batteries. Although alkaline batteries perform better and last longer in some small appliances they have too strong an initial jolt and often burn out the igniter filament. <u>Strongest isn't best in this application.</u> If you have fresh non-alkaline batteries and it still won't glow, the igniter probably needs replaced. To prevent igniter burn-out do not let the igniter come in contact with the side of the wick or stay in the flame after ignition.

Link to source web page: http://www.worldmkting.com/technical.htm

SNIPPET 831:

2. 24 QUATERNARY AUSTRALASIA 2003 VOLUME 21 NO 2 fiedifice that regularly drops chunks of masonry on the street below. Their laboratory equipment burns out continually from the daily water and electricity cuts in Tbilisi, and last month the resident cat sparked a flea infestation. <u>Last year they had a refugee crisis.</u> People left homeless after the recent Georgian civil war laid siege to the Institute, taking up residence in the library, director's office, laboratory and hallways. The police did nothing, so the Institute workers took it upon themselves to evict their new tenants...

Link to source web page: http://www.aqua.org.au/AQUA/QA/QA_2003_21_2.pdf

FIGURE 8F
EXAMPLE SEARCH RESULTS

SCREEN 805

Snippets 3 - 4 of 221:    BACK    NEXT

SNIPPET 832:

3. The keyboard and the mouse both have a sophisticated silver-coloured border and a design that perfectly fits together. The keyboard is equipped with 13 special keys (10 user definable) with functions like volume control, sleep mode, web browser and messenger application. A clear indicator on the keyboard informs the user about battery status so it never runs unexpectedly out of power and thanks to enhanced power management functionality the batteries will last for months. The ergonomically shaped mouse is equipped with optical technology (800 DPI) for precise movements, a comfortable rubber top coating for a firm grip and two extra side buttons that offer very easy navigation. The compact receiver can be connected to a USB port on the computer.

Link to source web page: http://www.trust.com/press/pressreleases/pressrelease.aspx?id=3911

SNIPPET 833:

4. Thanks to the energy-saving Venus Engine™ Plus and a long-lasting battery, the slim DMC-FX01 lets you take shot after shot without running out of power. It takes up to 320 shots on a single battery charge -- about 18% more than the DMC-FX9.

Link to source web page: http://www.hotbuyselectronics.com/item_detail.php?item_id=111845

FIGURE 9A

CONCEPT FEATURE DATABASE

| Linguistic Feature | SU 1 | SU 2 | SU 3 | SU 4 | SU 5 | SU 6 | SU 7 |
|---|---|---|---|---|---|---|---|
| ⋮ | | | | | | | |
| problem/n | S B 0.7 | | | | | | |
| ⋮ | | | | | | | |
| solve/v | S B 0.7 | S G 0.75 | A B 0.7 | A G 0.75 | P B 0.7 | P G 0.75 | P S 0.7 |
| ⋮ | | | | | | | |
| with/prep | O + 0.7 | | | | | | |
| ⋮ | | | | | | | |

FIGURE 9B

SEMANTIC UNIT STRUCTURE

<SRL> <CL> <RLI> where:
    <SRL>: Syntactic Relationship Label, specifies a lexical unit, of the sentence being
        classified, to which is assigned the SU's SI value
    <CL>: Concept Label, specifies the concept indicated
    <RLI>: Reference Level Indicator, can assume a value in the range 0.0 to 1.0,
        specifies the strength and/or likelihood with which the concept is indicated

FIGURE 9C

SYNTACTIC RELATIONSHIP LABELS

| Symbol | Brief Descrip. | Comments |
|---|---|---|
| S | Self | Always applied to a noun, almost always applied to an adjective or adverb. A word is tagged "Self" if either: i) its meaning does not spread to other words or ii) the rules of English, as applied to the part of speech the word represents, can determine how the word's meaning is applied to other words of the sentence. Since a noun does not spread its meaning to other words, but can only have its meaning adjusted by other words of a sentence, it is always tagged "Self." For almost every adjective or adverb, the rules, governing the way it effects the meaning of other words, are the same. Contrast with verbs where, depending upon the particular verb, there is a need to specify whether its Agent or Patient is effected. |
| E | Ergative | Only applied to verbs. The Ergative of a verb refers to the Patient of the sentence, if there is a Patient. Otherwise, if the sentence has no Patient, the Ergative of a verb refers to the Agent. |
| A | Agent | Only applied to verbs. Almost always (e.g., 8 times out of 10), Agent refers to the subject of an active verb (i.e., it refers to the thing or entity that does the action called for by the verb). However, an Agent can also be the object of the preposition "by" in association with a passive verb. Just the fact that a word is a "verb" does not tell you whether its meaning is spread to its Agent; you need to know the particular semantics of the verb. |
| P | Patient | Only applied to verbs. Almost always (e.g., 8 times out of 10), Patient refers to the direct object of an active verb (i.e., it refers to the thing or entity to which the action, called for by the verb, is done). However, a Patient can also be the subject of a passive verb. Just the fact that a word is a "verb" does not tell you whether its meaning is spread to its Patient, you need to know the particular semantics of the verb. |
| R | Recipient | Only applied to verbs. The indirect object of a "dative" verb: the person or thing who is given something. Very rare, Recipient is not used at all in the current Feature List. |
| O | Object | Only applied to prepositions. Returns the object following a preposition. |
| C | Clause | The predicate inside a relative clause (following a relative pronoun) or dependent clause (following a subordinating conjunction). |

FIGURE 9D

PINNACLE CONCEPTS

| Short Name | Long Name | Type | Description |
|---|---|---|---|
| ~ | Negation | Quantifier | Acts to completely negate or reverse a condition. Like a minus sign in a mathematical equation, completely reverses the truth or falsity that would have existed if the negation were not present. |
| S | Solution | Quantifier | Refers to something that is capable of canceling-out a Bad. Similar to negation, in that it flips a state that would otherwise have existed in the world, but only does such flipping on Bad and not on Good. |
| + | Intensify | Quantifier | Indicates an amount, compared to a default amount, that is greater. The metric, according to which the amount is greater, can be anything (e.g., it can be an amount of emphasis, quantity, intensity or relevance). |
| - | Diminish | Quantifier | Mirror image of Plus: indicates an amount, compared to a default amount, that is less. |
| ++ | Increase | Quantifier | Indicates an amount that becomes greater over time. The metric, according to which the amount becomes greater, can be anything (e.g., it can be an amount of emphasis, quantity, intensity or relevance). |
| -- | Decrease | Quantifier | Mirror image of Increase: indicates an amount that becomes less over time. |
| G | Good | Non-Quantifier | Indicates high utility or benefit when compared to a default level. Note, however, that the default level may only be implicitly present. |
| B | Bad | Non-Quantifier | Indicates low utility or benefit when compared to a default level. Note, however, that the default level may only be implicitly present. |

FIGURE 9E

QUANTIFIER TYPE TO BASE VALUE MAP

| Symbol | Name | Quantifier Type | Base |
|---|---|---|---|
| ~ | Negation | Negation | -1 |
| S | Solution | Negation | -1 |
| + | Intensify | Non-Negation | 1.25 |
| - | Diminish | Non-Negation | 0.7 |
| ++ | Increase | Non-Negation | 1.25 |
| -- | Decrease | Non-Negation | 0.7 |

FIGURE 10A

INPUT SENTENCE 1000: "Using a capacitor solves the problem with voltage."

FIGURE 10B

LEXICAL UNIT IDENTIFICATION AND PART OF SPEECH TAGGING

| Lexical Unit | PoS |
|---|---|
| using | verb participle |
| a | determiner |
| capacitor | noun |
| solves | verb |
| the | determiner |
| problem | noun |
| with | preposition |
| voltage | noun |

EXAMPLE PARSE STRUCTURE

SEEDED WITH QUANTIFIER AND NON-QUANTIFIER VALUES

AFTER QUANTIFIER PROPAGATION

POWER LAW APPLIED TO NON-NEGATION QUANTIFIERS

THRESHOLDING APPLIED TO NEGATION QUANTIFIERS

POWER LAW APPLIED TO NEGATION QUANTIFIERS

ASSIGN UNIQUE ID FOR EACH QUANTIFIER CONCEPT-VALUE PAIR

BACK PROPAGATION OF EACH QUANTIFIER CONCEPT-VALUE PAIR

AFTER SCALING NON-QUANTIFIERS WITH QUANTIFIERS

AFTER PROPAGATING NON-QUANTIFIER CONCEPT-VALUE PAIRS
AND AT EACH NODE, FOR EACH CONCEPT, ONLY CONCEPT-
VALUE PAIR WITH MAXIMUM VALUE IS KEPT

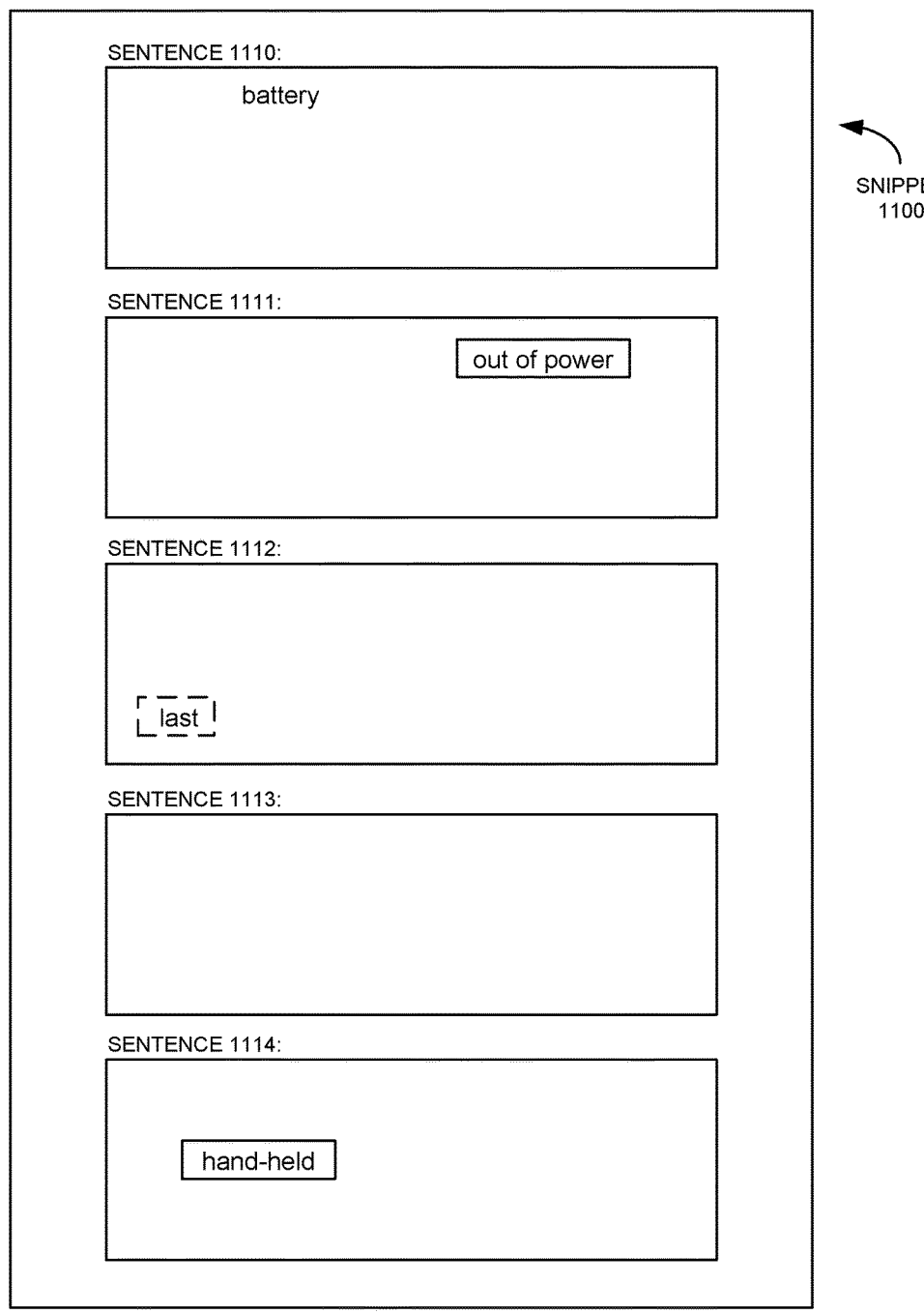

FIGURE 12A

INPUT SENTENCE 1200 → Storms <u>cancel</u> games but organizers plan accordingly.

FIGURE 12B

INPUT SENTENCE 1201 → Storms <u>cancel</u> <u>no</u> games but organizers plan accordingly.

FIGURE 12C

INPUT SENTENCE 1202 → <u>No</u> storms <u>cancel</u> games but organizers plan accordingly.

FIGURE 12D

INPUT SENTENCE 1203 → Storms <u>never</u> <u>cancel</u> games but organizers plan accordingly.

FIGURE 12E

INPUT SENTENCE 1204 → Storms <u>cancel</u> games but organizers <u>never</u> plan accordingly.

METHOD AND APPARATUS FOR CONCEPT-BASED CLASSIFICATION OF NATURAL LANGUAGE DISCOURSE

As provided for under 35 U.S.C. § 120, this patent claims benefit of the filing date of the following U.S. patent application, herein incorporated by reference in its entirety:

"Method and Apparatus For Concept-Based Classification of Natural Language Discourse," filed 2011 Nov. 1 (y/m/d), having inventors John Andrew Rehling and Michael Jacob Osofsky, and application Ser. No. 13/286,799.

As provided for under 35 U.S.C. § 120, application Ser. No. 13/286,799 claimed benefit of the filing date of the following U.S. patent application:

"Method and Apparatus For Concept-Based Classification of Natural Language Discourse," filed 2006 May 29 (y/m/d), having inventors John Andrew Rehling and Michael Jacob Osofsky, and application Ser. No. 11/420,782.

CROSS REFERENCE TO RELATED APPLICATIONS

This application is related to the following three U.S. patent applications, all of which are herein incorporated by reference in their entirety:

"Method and Apparatus For Concept-Based Classification of Natural Language Discourse," filed 2006 May 29 (y/m/d), having inventors John Andrew Rehling and Michael Jacob Osofsky, and application Ser. No. 11/420,782;

"Method and Apparatus For Concept-Based Searching of Natural Language Discourse," filed 2006 May 29 (y/m/d), having inventors John Andrew Rehling and Michael Jacob Osofsky, and application Ser. No. 11/420,785; and "Method and Apparatus For Concept-Based Ranking of Natural Language Discourse," filed 2006 May 29 (y/m/d), having inventors John Andrew Rehling and Michael Jacob Osofsky, and application Ser. No. 11/420,788.

FIELD OF THE INVENTION

The present invention relates generally to the search of computer-accessible content, and more particularly to enhancing the effectiveness of searching computer-accessible content containing natural language discourse.

BACKGROUND OF THE INVENTION

A common activity, given the increasing availability of computer-accessible content, is to generate indexed databases of such content and to provide keyword-based search facilities for accessing the information.

For example, a large percentage of the pages, on the World-Wide Web, have been made keyword searchable by search engines. An example search engine is GOOGLE, of Mountain View, Calif., U.S.A.

Keyword search is most effective when records, that are likely to be of interest to the user, can be located with terms that are highly specific to the topic of interest. In many instances, however, highly specific keyword terms can only partly describe the topic of interest. The problems resulting from this inability of keywords, to more fully describe certain search topics, can be twofold. First, a set of records can be returned that is too large for the user to review in a reasonable amount of time. Second, the set of records returned can include many records that are off-topic.

GOOGLE attempts to address the limitations of keywords by ranking the records (more specifically, the web pages) returned according to a "popularity" metric. According to GOOGLE, the popularity of a web page is proportional to the number of other web pages that point to it.

However, for many types of search topics, popularity is not an acceptable proxy for the portion of the topic that could not be adequately expressed with keywords.

An example search topic, where popularity is not an acceptable proxy, is the search for new uses of an existing technology "ET1." To address this search topic, one would like to search the entire Internet for those web pages where problems (or market needs), that technology "ET1" can be effective at addressing, are discussed. The authors of such pages are likely to be interested in using technology "ET1." Unfortunately, it is difficult to express, with keywords, the requirement that a web page express or utilize the concept of "problem" or "market need."

Another example search topic, where popularity is not an acceptable proxy, is the search for an existing technology that can address a problem "P1." To address this search topic, one would like to search the entire Internet for those web pages where claims of success, at addressing "P1," are discussed. The authors of such pages are likely to be knowledgeable about an existing technology that can address "P1." Unfortunately, it is difficult to express, with keywords, the requirement that a web page express or utilize the concept of "claim of success."

It would therefore be desirable to be able to retrieve records not only on the basis of keywords, but also on the basis of whether a record addresses a concept.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIGS. 1A-1B depict the processes of, respectively, the indexing and search phases;

FIG. 2B depicts the general structure of the process presented in section 2.2 ("Pseudocode and Example");

FIG. 3 depicts an example computer system design in which the techniques described herein can be applied;

FIG. 4 depicts pseudocode for indexing;

FIGS. 5A-5B depict, respectively, pseudocode for query accepting and keyword-based searching;

FIGS. 5C-5D depict an example procedure for implementing concept-based ranking;

FIGS. 6A-6G depict an example pseudocoded procedure ("sentence_classify") for performing classification of a sentence;

FIGS. 7A-7B depict an example operation of query_score in the pseudocode;

FIG. 8A depicts an example query where the searcher has an existing technology, for making batteries last longer, and would like to find potential licensees;

FIG. 8B depicts a page that is the same as the page of FIG. 8A, except that a concept property has been added to each query term;

FIG. 8C depicts a web-based interface through which a user can select the CBDBs to be keyword searched;

FIG. 8D depicts a screen at which a user can specify a keyword search;

FIGS. 8E-8F depict example results of initiating a search;

FIG. 9A depicts an example concept feature database;

FIG. 9B depicts an example structure of a semantic unit;

FIG. 9C depicts a table of example syntactic relationship labels;

FIG. 9D depicts a table of example pinnacle concepts;

FIG. 9E depicts an example map from Quantifier type to base value;

FIG. 10A depicts an example input sentence 1000 for illustrating the operation of sentence_classify;

FIG. 10B depicts a table of lexical units and part-of-speech designations for the example input sentence 1000;

FIG. 11 depicts an example snippet to illustrate concept-based ranking; and

FIGS. 12A-12E depicts five similar sentences, labeled 1200-1204, that are intended to be illustrative of how occurrences of the negation Quantifier "Negation," in a sentence, can interact at governing nodes.

DETAILED DESCRIPTION OF PREFERRED EMBODIMENTS

Figure 1C:
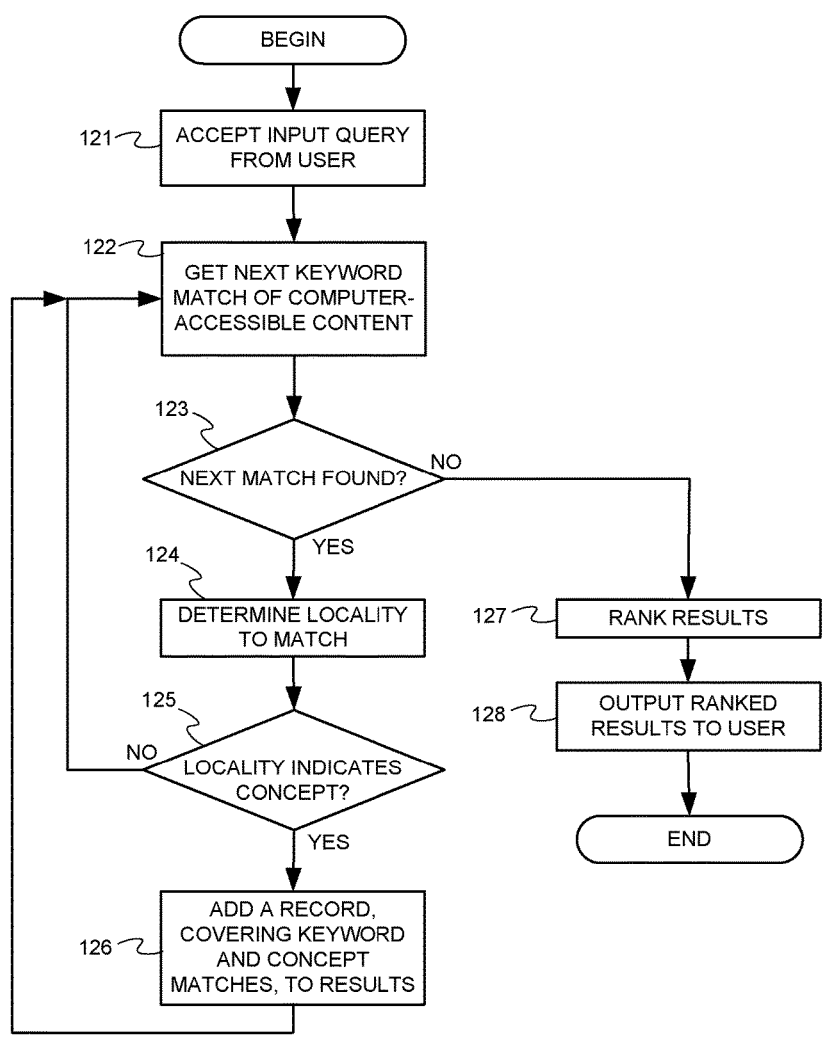
FIG. 1C depicts concept-based search used in conjunction with keyword-based search.

Reference will now be made in detail to various embodiments of the invention, examples of which are illustrated in the accompanying drawings. Wherever possible, the same reference numbers will be used throughout the drawings to refer to the same or like parts.

Please refer to the Glossary of Selected Terms, included at the end of the Detailed Description, for the definition of selected terms used below.

Table of Contents to Detailed Description

1. Concept-Based Search
   1.1. Plains and Pinnacle Concepts
   1.2. Combining Concept-Based and Keyword-Based Search
      1.2.1. Overview
      1.2.2. Two-Phase Approach
   1.3. Example Search Problems
      1.3.1. New Uses For An Existing Technology
      1.3.2. Finding A Technology To Address A Problem
   1.4. Example Search
2. Concept-Based Classification
   2.1. Overview
      2.1.1. "reference" or "assertion" by a UNLD
      2.1.2. Correlative Concepts
      2.1.3. Reference Level Values
      2.1.4. Quantifiers and Non-Quantifiers
      2.1.5. Linguistic Features
      2.1.6. Complete Concept Feature Sets
      2.1.7. Sub-Unit Application of Quantifiers
   2.2. Pseudocode and Example
      2.2.1. Parse
      2.2.2. Populate Parse Structure
      2.2.3. Quantifier Propagation
      2.2.4. Determine Quantifier Values
         2.2.4.1. Non-Negation Quantifiers
             2.2.4.1.1. Sum Values On Per-Concept Basis
             2.2.4.1.2. Apply PLQ
         2.2.4.2. Negation Quantifiers
             2.2.4.2.1. Thresholding
             2.2.4.2.2. Sum Values On Per-Concept Basis
             2.2.4.2.3. Apply PLQ
      2.2.5. Quantifier Back Propagation
      2.2.6. Scale Non-Quantifier Values With Quantifier Values
      2.2.7. Propagate Non-Quantifiers
      2.2.8. Select Maximum Non-Quantifiers
      2.2.9. Summary
3. Concept-Based and Keyword-Based Search, Pseudocode
   3.1. Indexing
   3.2. Query Accepting
      3.2.1. Query Form
      3.2.2. Page Usage Techniques
      3.2.3. Example Query
   3.3. Keyword-based Searching
4. Concept-Based Ranking
   4.1. Overview
   4.2. Scoring a Snippet Relative to a Query
5. Further Details
   5.1. Pinnacle Concepts
      5.1.1. Other Pinnacle Concepts
      5.1.2. Multiple Pinnacle Concept Concept-Based Search
      5.1.3. Deriving a Concept-Feature Database
   5.2. Snippet Formation
   5.3. Production Environment
   5.4. Example Negation Propagation
6. Glossary of Selected Terms

1. CONCEPT-BASED SEARCH

1.1. Plains and Pinnacle Concepts

As addressed herein, the general problem of searching computer-accessible content (see Glossary for definition of computer-accessible content) can be described as the utilization of an automated process to determine occurrences of where a sought-for concept (or search topic) is referred to in natural language discourse. Natural language discourse "refers" to (or references) a concept "C" when it uses linguistic expressions in such a way that "C" is regarded as expressed, used or invoked by an ordinary reader of the human language "L" in which the discourse is written.

Herein, two broad categories of search topic are defined: "plains concepts" and "pinnacle concepts."

Plains concepts are relatively easy to search for because references to them can be detected by the occurrence of certain keywords (see Glossary for definition of keyword-based search). A plains concept can be characterized as follows. It is a concept that, in general, is infrequently used or expressed in natural language discourse. The set of lexical units, that refer to the plains concept, to some degree, is very small. A plains concept tends to be low-level (or "concrete") and tightly linked to particular types of objects. Most of the lexical units, in any given human language, are used to indicate a plains concept. An example plains concept is the concept of an "apple." There are very few lexical units of English, other than the lexical unit "apple" itself, that refer to the concept of "appleness." As a convention herein, to indicate that a lexical unit is being used as a symbol for a concept, as opposed to using that lexical unit as a lexical unit, the lexical unit will be capitalized and enclosed in double quotes. For example, "Apple," as used herein, is a symbol for the concept of an "apple."

References to pinnacle concepts are not amenable to detection by the use of keywords. A pinnacle concept can be characterized as follows. It is a concept that, in general, is frequently used or expressed in natural language discourse. The set of lexical units, that refer to the pinnacle concept, to some degree, is very large. A pinnacle concept tends to be high-level (or "abstract") and lightly linked to particular types of objects. An example pinnacle concept is the concept of "goodness" (referred to herein as "Good"). There are many lexical units of English, other than just the lexical unit "good," that refer to, at least to some degree, the concept "Good."

Pinnacle concepts are not amenable to keyword search for at least the following reasons. First, the fact that a pinnacle concept is indicated by a very large set of lexical units means that a very large set of keywords would need to be used. Second, even if one were to search for the very large set of keywords required, the "strength" or probability with which different lexical units indicate a pinnacle concept can differ widely. Further, the initial "strength" or probability with which a pinnacle concept "C" is indicated, can vary greatly (in either the positive or negative direction) depending upon the presence of other pinnacle concepts that are within sufficient proximity to "C" (where proximity to "C" is determined by the rules of the human language in which "C" is expressed).

The term "concept-based search," as used herein, refers to the reliable identification, within computer-accessible content that represents natural language discourse, of instances in which a particular pinnacle concept "C" is referenced.

1.2. Combining Concept-Based and Keyword-Based Search 1.2.1. Overview

Concept-based search can be accomplished, on computer-accessible content, according to a particular unit of natural language discourse (or UNLD). For example, the UNLD can be the sentence. In this case, each sentence of the computer-accessible content can be separately analyzed for whether it references a particular pinnacle concept.

Concept-based search can be used in conjunction with keyword-based search as follows. The process is explained in conjunction with FIG. 1C.

An input query is accepted from the user. Step 121. The input query specifies both a concept and keywords to be searched for.

The next (or first) match of the keyword search, in the computer-accessible content, can be found. Step 122.

If a match, of the keyword query, is found (the "yes" path of step 123), a locality to that keyword match is determined (step 124).

If a match, of the concept query, is found within the locality (the "yes" path of step 125), a record, that includes both the keyword and concept matches, is added to the search results (step 126). If a match, of the concept query, is not found within the locality (the "no" path of step 125), a next keyword match can be searched for. Step 122. A next keyword match can also be searched for after a record (in step 126) is added to the search results.

When a next keyword match is no longer found (the "no" path of step 123), the collected records can be ranked (step 127) and displayed for the user (step 128).

The above-described process, that performs the keyword search before the concept search, can be desirable if the identification of a match, of the keyword query, is less computationally expensive than identification of a match of the concept query. Alternatively, step 122 can obtain a next match of the sought-for concept in the computer-accessible content and step 125 can determine whether the locality to the concept matches the keyword search.

Regardless of whether step 122 is searching for a keyword or concept match, if it is assumed the match occurs within a UNLD "u" of the computer-accessible content, the locality to the match (that is then searched in step 125) can be a certain number of UNLDs surrounding "u." A package of text comprising "u," and a certain number of UNLDs surrounding "u," is referred to herein as a "snippet." An example UNLD is a sentence.

The snippet can be chosen to be of a sufficient size such that, on a statistical basis, it provides sufficient factual context for a user to understand whether "u" is relevant to his or her search topic.

1.2.2. Two-Phase Approach

When using concept-based search with keyword-based search, it can be useful, from an efficiency perspective, to divide the process into two phases. These two phases can be referred to as the "indexing phase" and the "search phase." The indexing phase is the temporally earlier phase in which concept-based searching is performed and a database, referred to herein as a concept-based database, is generated. In the search phase, keyword-based searching is performed on the concept-based database created during the indexing phase.

An illustration, of the process of the indexing phase, is shown in FIG. 1A. During the indexing phase the computer-accessible content is searched, according to units of natural language discourse, for references to a concept "C." In FIG. 1A, the unit of natural language discourse can be a sentence. More specifically, in step 101 a next (or first) UNLD (e.g., a next sentence) of the computer-accessible content can be obtained. If a next UNLD is not found, the indexing phase ends (the "no" path of step 102 is followed). If a next UNLD is found, it is tested (by step 103) for whether it is indicative of a sought-for concept "C." If a UNLD "U" references "C," then (the "yes" path of step 103 is followed) a snippet is determined around "U" (step 104) and the snippet is added (step 105) to a concept-based database (CBDB). Addition of the snippet to the CBDB also includes indexing the snippet such that it can be efficiently keyword searched, along with other snippets added to the CBDB. The concept "C," that serves as a criteria for whether a snippet is added to the CBDB, is referred to herein as the "organizing concept" for the CBDB. Following indexing of the snippet, the indexing process can continue by looping back (from step 105) to the step of obtaining a next UNLD for analysis (at step 101). If a UNLD "U" does not reference "C," then (by the "no" path of step 103) the process can loop back to the step of obtaining a next UNLD for analysis (at step 101).

An illustration, of the process of the search phase, is shown in FIG. 1B. In step 111, a keyword-based search query is accepted from the user. The user also selects the particular CBDB to be searched by the keyword-based query. In step 112 a keyword search is performed of the selected CBDB. The results of the keyword search are ranked according to an appropriate metric. Step 113. The ranked search result is output to the user. Step 114.

1.3. Example Search Problems 1.3.1. New Uses for an Existing Technology

An example type of a search problem, that can be usefully addressed by concept-based search, is the search for new uses of an existing technology "ET1." This search topic can also be referred to as a search for "market needs."

An approach to searching for new uses of an ET1 is described in this section using the above-described two-phase process.

For this search problem, the computer-accessible content to be searched can be an input database that is comprised of a large portion of those pages posted on the Internet that are technologically oriented. The input database can be obtained through known techniques, such as web crawling, where the web crawling is "seeded" to start from technologically oriented web sites. An example suitable web crawling program is the open-source program called "Heritrix." Heritrix is made available through VA Software of Freemont, Calif., U.S.A. The input database can also be compiled from any other suitable sources of computer-accessible data. Examples of such other sources include the following: CD-ROMs; record-oriented databases (relational or otherwise); and a company intranet.

A CBDB can be compiled, from the input database, according to the organizing concept "Bad." The concept "Bad" occurs, in a unit of natural language discourse (typically, a single sentence), when that unit refers to, with regard to something, a negative, detriment or badness that is of, or related to, that something.

The CBDB formed, when the organizing concept is "Bad," shall be referred to herein as CBDB ("Bad"). When searching for a new use for an existing technology, CBDB ("Bad") can be useful since it contains statements where a problem of some kind is being discussed. It is reasonable to assume that a party encountering a problem is likely to wish to expend resources to address the problem.

The second step, in finding new uses for an ET1, is to keyword search CBDB ("Bad") to select problem discussions that are likely to be about a type of problem that ET1 can help address.

1.3.2. Finding a Technology to Address a Problem

Another example type of a search problem, where concept-based search can be useful, is the search for a technology to address an existing problem "EP1." This search topic can also be referred to as a search for "market claims" since the search is for a technology that is accompanied by claims that would lead one to conclude that it might be capable of addressing "EP1."

Searching for a technology applicable to an EP1 can be accomplished according to the same two-phase process discussed above (for finding a new application of an existing technology), except that the organizing concept for the CBDB is "Good" rather than "Bad." The concept "Good" occurs when a unit of natural language discourse refers to, with regard to something, a positive, benefit or goodness that is of, or related to, that something.

The CBDB formed, when the organizing concept is "Good," shall be referred to herein as CBDB ("Good"). When searching for a technology to address a problem, CBDB ("Good") can be useful since it contains statements where a solution of some kind is being discussed. Keyword search can be used to filter CBDB ("Good") for those solutions that may be useful for addressing the particular factual problem at issue.

1.4. Example Search

While discussed further, in section 3 ("Concept-Based and Keyword-Based Search, Pseudocode") and section 4 ("Concept-Based Ranking"), this section introduces an example search that is the type of search problem presented above in section 1.3.1 ("New Uses For An Existing Technology").

For this example, we assume that CBDB ("Bad") and CBDB ("Good") have already been compiled. The user has an existing technology, for making batteries last longer, and would like to find potential licensees. As discussed further in below section 5.3 ("Production Environment"), the user can specify his or her search through a web-based interface.

FIG. 8C depicts a screen 802 which a user could view through a web-based interface. As can be seen, the user can select the CBDBs to be keyword searched by putting a check mark in the appropriate boxes. For screen 802 two CBDBs are available: "Market Needs" (which is another name for CBDB ("Bad")) and "Market Claims" (which is another name for CBDB ("Good")). In this case, the user has only checked the "Market Needs" CBDB. The user can then select the "next" button to move to a next screen in the search formulation process.

FIG. 8D depicts a screen 803 at which a user can specify a keyword search. The particular form of keyword entry provided is described below in section 3.2.1 ("Query Form"). The unit of query specification, provided for by screen 803, is called a "page" (which is why screen 803 is referenced as "PAGE 803" in FIG. 8D). While described further below in section 3.2.2 ("Page Usage Techniques"), the general strategy is that a page "p" is written such that any snippet "s," that satisfies "p," is likely to be of interest to the user for his or her particular search topic. Further, within a satisfied page "p," the more query terms that are satisfied, the more likely "s" is to be of interest to the user.

FIG. 8B depicts a page 801, that is the same as page 803, except that a user has completed the page with search terms intended to locate snippets that discuss problems with battery power. A detailed discussion of FIG. 8B is found in below section 4 ("Concept-Based Ranking"). In explaining page 801, section 4 first refers to section 3.2.3. ("Example Query"). Section 3.2.3 explains a page 800 (of FIG. 8A) that is a simpler form of page 801. Page 800 differs from page 801 in lacking the "concept property" field.

Example results, of initiating a search based upon page 801, are depicted in FIGS. 8E and 8F. For this search, a total of 221 snippets were found. These snippets are ranked according to how well each satisfies the query of page 801. FIG. 8E depicts snippets 1 and 2, of the 221 snippets (which are also labeled, for purposes of clarity, as snippets 830 and 831). FIG. 8F depicts snippets 3 and 4, of the 221 snippets (which are also labeled, for purposes of clarity, as snippets 832 and 833). If the user decides a snippet is relevant to the search problem, a link to the source web page, from which the snippet was extracted, is provided below each snippet. For each snippet displayed, the sentence of the snippet, that caused the snippet to be included in CBDB ("Bad"), is underlined. The default snippet size, for the particular CBDB ("Bad") searched, is 5 sentences per snippet with the central sentence being the one that caused the snippet to be included in CBDB ("Bad"). As can be seen in FIGS. 8E and 8F, snippets 830 to 832 are each five sentences long while snippet 833 is only two sentences long because it is limited by "edges," in the source text, both before and after the underlined sentence.

An examination of snippet 830 shows that it is certainly related to the topic of battery life, but that it is not likely to lead to a party that would be interested in longer lasting batteries. In fact, this snippet appears to be discussing an application where batteries that have a longer life is not desirable.

An examination of snippet 831 shows that it is not related to the topic of battery life. This snippet appears to be describing a struggle to keep a laboratory running during a period of civil unrest in a former Soviet satellite country.

Snippets 832 and 833, however, appear to be "on point." Snippet 832 discusses a wireless keyboard and mouse, which is certainly an application where longer lasting batteries are useful. Snippet 833 discusses a digital camera, another application where longer lasting batteries are useful.

2. CONCEPT-BASED CLASSIFICATION

2.1. Overview

The term "concept-based classification" (or simply "classification"), as used herein, refers to the identification of whether a pinnacle concept is asserted by a unit of natural language discourse (UNLD) written in a human language "L." An example UNLD is the sentence.

2.1.1. "Reference" or "Assertion" by a UNLD

A UNLD "refers" to a concept "C" when that UNLD uses linguistic expressions in such a way that "C" is regarded as expressed, used or invoked by an ordinary reader of "L." Repeated application of concept-based classification is the basis for concept-based search (as discussed above). The unit of natural language discourse focused-on herein is the sentence.

Reference to a concept "C" can apply regardless of whether the UNLD, that refers to "C," has been interpreted relative to the UNLD's Quantifier concepts (see section 2.1.4 for definition of Quantifier). Thus, for example, while a UNLD may refer to a concept "C," application of a Quantifier of type "negation," in a later interpretive process of the UNLD, can invert the concept (i.e., not "C" is determined to be the concept actually referred to by the UNLD). A concept "C," that is determined to be referenced by a UNLD "x," after application of its Quantifiers, is said to be asserted by "x."

As an example, a sentence "s" can contain the expression "not good." While "s" can be said to refer to the concept "Good," "s" does not assert "Good." This is because application of the Quantifier negation (invoked by the lexical unit "not") inverts the concept referenced to being "Bad." Thus "Bad" is asserted by "s" (and "Bad" is also referenced by "s").

2.1.2. Correlative Concepts

Two pinnacle concepts, whose identification is focused-on in this section, are "Good" and "Bad." The concepts "Good" and "Bad," when paired, are an example of what is called, herein, "correlative concepts." In general, a concept "A" and a concept "B" are defined herein to be correlative if not "A" means "B" and not "B" means "A." "Good" and "Bad" are correlative concepts since, in general, an ordinary reader regards something that is not "Good" as "Bad" and something that is not "Bad" is "Good."

The "dimensional concept," for the correlative concepts "Good" and "Bad," is referred to herein as "Quality." In general, a dimensional concept is the broader concept that encompasses both concepts of a pair of correlative concepts.

2.1.3. Reference Level Values

During the classification process, each pinnacle concept identified can assume a "reference level" value from within a range of values. Depending on the application, the magnitude of the reference level value can be proportional to: the "strength" with which the pinnacle concept is referenced, the probability that a pinnacle concept is referenced or both the "strength" and probability of a pinnacle concept reference. An example reference level range is 0 to 1, with 0 meaning the reference is of no strength and/or probability and a 1 meaning the reference is of maximal strength and/or probability. To give an example, consider the concept "Bad." The word "bad" itself could be regarded as referring to "Bad" with a reference level that is, on a scale of 0 to 1, 0.75. However, the phrase "very bad" needs to be assigned a reference level greater than 0.75 (but still less than 1.0). This is because the word "very" can be regarded as increasing the "strength" and/or probability that "Bad" is referred to by the word "bad."

2.1.4. Quantifiers and Non-Quantifiers

Figure 2A:
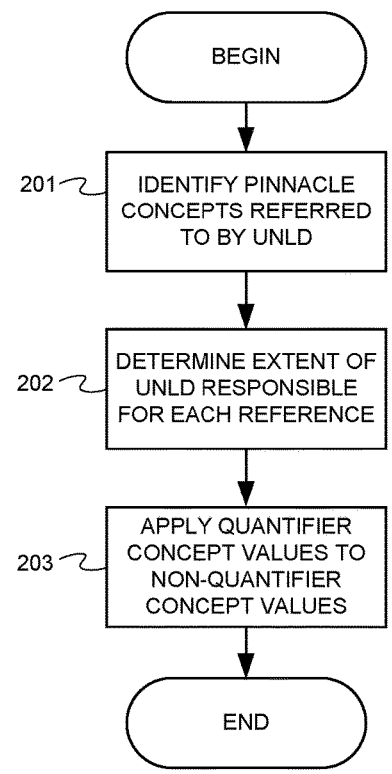
FIG. 2A depicts a process for performing classification of a unit of natural language discourse.

FIG. 2A presents a process for performing classification of a unit of natural language discourse (or UNLD). As can be seen, the process begins by identifying the pinnacle concepts referred to by the UNLD (step 201). The types of pinnacle concepts that can be referred to include both "Quantifier" and "non-Quantifier" concepts. A Quantifier concept is a concept that can modify the reference level assigned to a non-Quantifier concept. A subset, of the set of non-Quantifier concepts, is referred to herein as the set of "Characteristic" concepts. A Characteristic concept is so-called because it describes a characteristic or property of an entity. For the phrase "very bad," the word "bad" can be regarded as a reference to a non-Quantifier concept (i.e., the concept "Bad") while the word "very" can be regarded as a reference to a Quantifier concept. The effect of "very" is to modify (i.e., it intensifies) the reference level of the reference to the non-Quantifier concept "Bad." Examples of Quantifier and non-Quantifier concepts are shown in FIG. 9D. As can be seen, "Good" and "Bad" are examples of non-Quantifier concepts. "Good" and "Bad" are also, more specifically, examples of Characteristic concepts. The Quantifier concept "Intensify" is the concept referenced by the word "very" in the phrase "very bad." Determination, of reference to pinnacle concepts by a UNLD, can be accomplished as follows.

2.1.5. Linguistic Features

For each pinnacle concept "C" (either Quantifier or non-Quantifier), whose reference is to be determined, a set can be compiled that is referred to herein as a "concept feature set." A concept feature set "s" is a set of linguistic features (see following paragraph for definition of "linguistic feature"). Each member of "s" can be used in connection with a normal, and helpful, reference to "C" in a human language "L." The occurrence of a member of "s," in a unit of natural language discourse (UNLD), is an indication that, with some reference level "r," the UNLD refers to "C."

The term linguistic feature can be defined as follows: any pattern within a human language "L," that is amenable to algorithmic detection and that has been determined to indicate, within the discourse within which it occurs, the expression or use of at least one pinnacle concept. An example of a lower-level pattern, sought to be matched by a linguistic feature, is a single lexical unit. However, another example pattern, that would be higher-level, can be as follows: any sequence of three words, limited only by each of the three words being a particular part of speech (e.g., a determiner followed by an adjective followed by a noun).

2.1.6. Complete Concept Feature Sets

In general, it is desirable for a concept feature set to be "complete." A test, for what constitutes a "complete" concept feature set, can be stated as follows. Let "corpus_x" represent the set of all normal and helpful UNLDs, that have been written in a human language "L," in which a pinnacle concept, "x," is referenced. Let "instances_x" represent size, in UNLDs, of "corpus_x." Let a concept feature set for "x," that may or may not be complete, be called "cfs_x." Let "cfs_x" be applied to "corpus_x" and let "all_positives" be the set of all UNLDs, of "corpus_x," indicated by "cfs_x" as referring to "x." Let "correct_x" represent the size of a subset of "all_positives," wherein a member of "all_positives" is a member of the subset if it actually refers to "x." Let "incorrect_x" represent the size of a subset of "all_positives," wherein a member of "all_positives" is a member of the subset if it does not actually refer to "x." Concept feature set "cfs_x" is complete if:

$$\frac{correct\_x}{incorrect\_x} > min\_correct \quad (i)$$

$$\left[1 - \frac{correct\_x}{instances\_x}\right] < max\_missed \quad (ii)$$

For example, if "min_correct" (or minimum correct) is set at 0.9, satisfying (i) means that, among the UNLDs indicated by "cfs_x" as positive for "x," better than 90 percent of them are actually positive for "x." If "max_missed" (or maximum missed) is set at 0.1, satisfying (ii) this means that, if cfs_x is applied to corpus_x, less than 10 percent, of the actual occurrences of references to "x," will be missed (i.e., will not be identified as references to "x").

In general, in order to make the task of finding a complete "cfs_x" as easy as possible, one will choose the smallest acceptable value for "min_correct," and largest acceptable value for "max_missed," based upon the amount of accuracy required by the particular application. For example, acceptable values for "min_correct" and "max_missed" can be determined empirically.

Further, since "corpus_x" is too large to be handled in practice, an approximation of corpus_x, that is a representative sampling of corpus_x, can be used. In this case, the values used, for instances_x, correct_x and incorrect_x, are approximations to their actual values.

2.1.7. Sub-Unit Application of Quantifiers

Once a pinnacle concept "C" has been identified as referenced, it can be useful to identify the particular sub-units (or parts), of the UNLD, responsible for such reference. For example, identification of the sub-units can allow Quantifier concepts to more accurately modify the reference levels of non-Quantifiers. Identification of the sub-units can be accomplished by application of the rules of the human language "L" in which the UNLD is expressed. This step is depicted, in FIG. 2A, by step 202. The granularity of the sub-units identified can vary based upon the application. An example level, of sub-unit identification, is the lexical unit level.

For each sub-unit "x" of the UNLD, where a non-Quantifier and a Quantifier concept are found referenced, the Quantifier values at "x" can be applied to modify the non-Quantifier values at "x." This is depicted, in FIG. 2A, by step 203.

2.2. Pseudocode and Example

FIGS. 6A-6G present an example pseudocoded procedure ("sentence_classify") for performing classification of a sentence. In this section, sentence_classify is presented along with an example input sentence 1000 (FIG. 10A). The input to sentence_classify is a sentence "S" (FIG. 6A, line 2) and the output is a parse structure "T" (FIG. 6G, line 22) to which has been added classification information. The classification information returned can be specified as concept-value pairs (discussed further below) that are associated with nodes of the parse structure. For each node of the output parse structure, its concept-value pairs, for non-Quantifier concepts, specify asserted concepts of the input sentence "S."

While the pseudocode presented herein describes application of a classification process to a sentence, the process can be applied to any other type of UNLD.

2.2.1. Parse

Figure 10C:
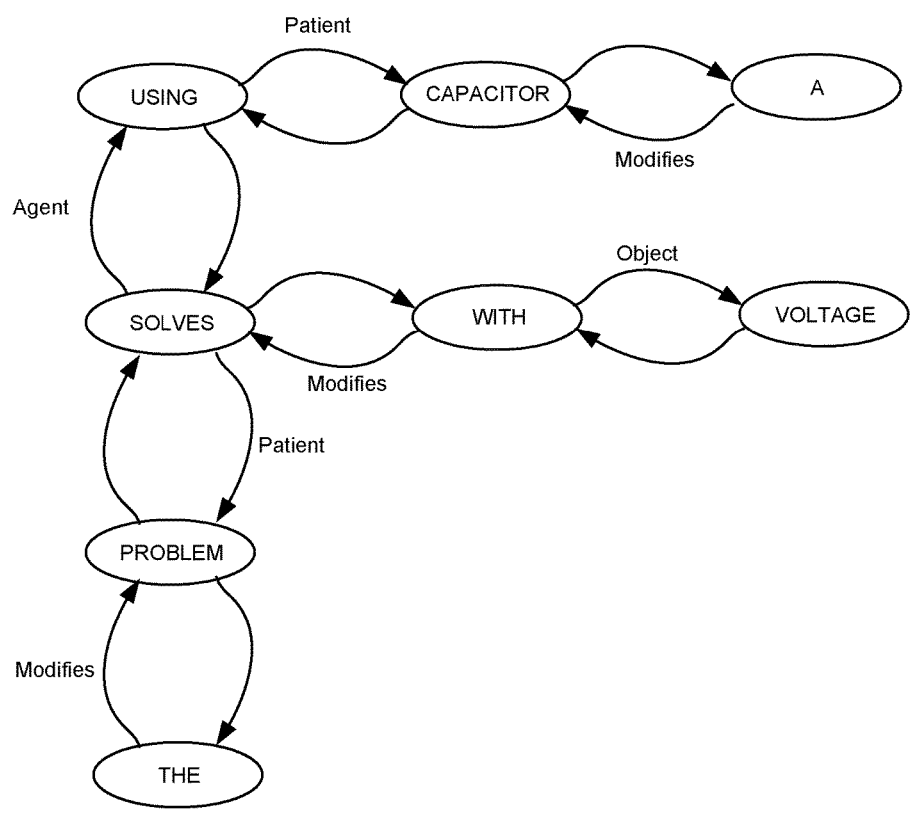
FIG. 10C depicts an example parse structure for example input sentence 1000.

Sentence classification can begin by parsing the input sentence "S" to produce a parse structure "T." FIG. 6A, line 4. The level at which "S" is parsed can depend on the application. An example level is for each parse structure node to represent a lexical unit. If the lexical unit level is utilized, parsing a sentence "S" involves segmenting "S" into its lexical units and marking the part of speech for each lexical unit. The result of applying these processes, to the example input sentence of FIG. 10A, is shown in FIGS. 10B and 10C. FIG. 10B depicts a table of lexical units and part-of-speech designations for the example input sentence 1000 while FIG. 10C depicts an example parse structure.

2.2.2. Populate Parse Structure

The parse structure can be populated, with the concepts referenced by the input sentence, as follows.

Each linguistic feature of "S" can be identified and collected in a list called "LF_list." FIG. 6A, line 11. For the case where the pattern to be matched, for a linguistic feature to apply, is a lexical unit, the determination of each linguistic feature of "S" can be accomplished as follows. Each lexical unit of "S" can be looked-up in a database referred to herein as a "concept feature database" (CFDB). An example CFDB is shown in FIG. 9A. As can be seen, for the example CFDB, each row, in the leftmost column, specifies a lexical unit pattern as a linguistic feature. The remaining columns of each row can specify one or more "semantic units" (or SUs). The SUs specify the concepts that are regarded as referred-to if the linguistic feature of that row is matched. It can be readily appreciated that, with sufficient rows in a CFDB and sufficient SUs per row, a CFDB can represent complete (or approximately complete) concept feature sets for multiple pinnacle concepts.

Each linguistic feature identified in "S" can be iterated over, with the current linguistic feature referred to as "LF_curr." FIG. 6A, lines 12-26.

As can be seen in FIG. 6A, line 14, a list of SUs, "SU_list," is determined for each value of LF_curr. Each SU of the SU_list is iterated over. FIG. 6A, lines 18-25. In general, a semantic unit, for a linguistic feature "LF" identified in a UNLD "x," can specify three items. First, the semantic unit can specify a pinnacle concept "C" that is regarded as referred-to whenever "LF" is found in a UNLD." Second, the semantic unit can indicate a sub-unit of "x" regarded as responsible, at least in part, for the reference to "C." Third, the semantic unit can specify a reference level with which "C" is referred-to.

The structure of each SU, for the example CFDB of FIG. 9A, is shown in FIG. 9B. As can be seen, the SU of FIG. 9B is comprised of three parts: a syntactic relationship label (SRL), a concept label (CL) and a reference level indicator (RLI). The CL specifies the pinnacle concept "C" that is regarded as referred-to because of the presence of LF_curr in input sentence "S". The RLI specifies a reference level with which "C" is referred-to. The SRL specifies a part of sentence "S," for example a lexical unit of "S," regarded as responsible, at least in part, for the CL and RLI values being applicable to "S."

Figure 10D:
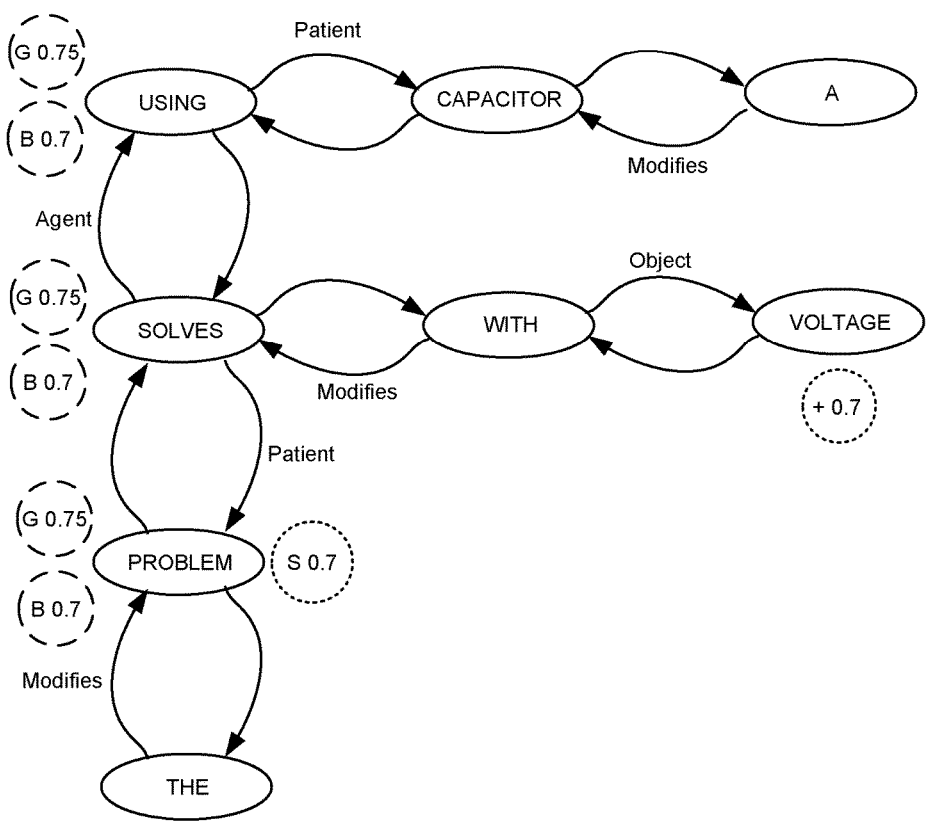
FIG. 10D depicts the example parse structure of FIG. 10C seeded with Quantifier and non-Quantifier values.

FIG. 10D depicts the example parse structure of FIG. 10C, to which the concept-value pairs, specified by the SUs, have been added. Each node of the parse structure corresponds to a lexical unit of the sentence to be classified. Each concept-value pair, attached to a node, indicates a pinnacle concept that is referred to by that node and the reference level of such referral. Thus, with respect to an SU, its SRL specifies the node, its CL specifies the concept of a concept-value pair and its RLI specifies the value of a concept-value pair. This assignment of concept-value pairs is shown in the pseudocode of FIG. 6A at line 24.

For the parse structure FIG. 10D, we can see that only the following lexical units match linguistic feature patterns in the CFDB of FIG. 9A: "solve," "problem" and "with." For example, the CFDB of FIG. 9A contains a row for the linguistic feature pattern "problem/n." Pattern "problem/n" matches the lexical unit "problem" when its part of speech is noun (indicated by the "/n"). The SU for "problem" is "S B 0.7." As can be seen in FIG. 9C, the SRL value "S" stands for "Self" which means that it is the linguistic feature that selected the SU that receives the RLI of that SU. As can be seen in FIG. 9D, the CL value "B" stands for "Bad." Therefore, in the parse structure of FIG. 10D, at the node for "problem," a concept-value pair is stored for "Bad" and 0.7.

Each concept-value pair, of the parse structure diagrams presented herein, is represented as a circle that contains a letter for the pinnacle concept and a value for the reference level of that pinnacle concept. Also, a circle composed of long dashes indicates concept-value where the concept is of type non-Quantifier while a circle composed of short dashes indicates concept-value where the concept is of type Quantifier.

Similar processing occurs for the linguistic feature patterns "solve/v" and "with/prep" of FIG. 9A. Pattern "solve/v" matches an occurrence of the lexical unit "solve" when its part of speech is verb (indicated by the "/v"). Pattern "solve/v" has seven semantic units that are processed as follows (from left to right).

The SUs "S B 0.7" and "S G 0.75" specify that "solve" itself receive a "Bad" value of 0.7 and a "Good" value of 0.75. Therefore, in the parse structure of FIG. 10D, at the node for "solve," two concept-value pairs are stored: ("Bad," 0.7) and ("Good," 0.75).

The SUs "A B 0.7" and "A G 0.75" specify, respectively, that the Agent of "solve" receive a "Bad" value of 0.7 and a "Good" value of 0.75. The agent of "solve" is determined from the parse structure information of FIG. 10D. As can be seen from FIG. 10D, the agent of "solve" is "using." Therefore, in the parse structure of FIG. 10D, at the node for "using," two concept-value pairs are stored: ("Bad," 0.7) and ("Good," 0.75).

The SUs "P B 0.7" and "P G 0.75" specify, respectively, that the Patient of "solve" receive a "Bad" value of 0.7 and a "Good" value of 0.75. The patient of "solve" is determined from the parse structure information of FIG. 10D. As can be seen from FIG. 10D, the patient of "solve" is "problem." Therefore, in the parse structure of FIG. 10D, at the node for "problem," two concept-value pairs are stored: ("Bad," 0.7) and ("Good," 0.75).

SU "P S 0.7" specifies that the Patient of "solve" receive a "Solution" value of 0.7. Therefore, in the parse structure of FIG. 10D, at the node for "problem," the following concept-value pair is stored: ("Solution," 0.7).

Linguistic feature pattern "with/prep" has one SU that is processed as follows. SU "O+0.7" specifies that the Object of "with" receive an "Intensify" value of 0.7. According to the parse structure of FIG. 10D, the object of with is "voltage." Therefore, in the parse structure of FIG. 10D, at the node for "voltage," the following concept-value pair is stored: ("Intensify," 0.7).

2.2.3. Quantifier Propagation

Those concept-value pairs of "T," where the concept is of type Quantifier, can be propagated through "T" as follows. This step of propagation is invoked in the pseudocode at FIG. 6B, line 10. Three main rules, for Quantifier propagation, are shown in the pseudocode comments of FIG. 6B at lines 1-9.

The first rule is that the propagations, of each concept-value pair, are kept separate. This can be accomplished by assigning a unique identifier to each concept-value pair. For example, suppose a concept-value pair "p" is assigned a unique identifier "id1." When "p" propagated, those additional copies of "p" can all be assigned "id1." In this way, when propagation is complete, all concept-value pairs, that resulted originally from "p," can be identified by the fact that their unique identifier is "id1."

The second rule is as follows. A concept-value pair, at a particular parse structure node "n," can only propagate to another node "x" if there is an edge from "n" to "x" and that edge is one of three types: "x" represents a verb "v" and "n" is the agent of "v;" "x" represents a verb "v" and "n" is the patient of "v;" or "n" represents a modifier and "x" is what "n" modifies. The principle behind the second rule is as follows: propagate a concept-value pair, at a parse structure node "n," to another node "x" only if "x", relative to "n," serves a more central role in the semantics of the sentence.

Each time a concept-value pair "p" arrives at a node "g," from which "p" can propagate no further, the node "g" is called a "governing" node of the sentence. The collection of Quantifiers, at governing nodes, produces centralized locations where the Quantifiers can more fully interact with each other. Therefore, at governing nodes, the net effect of Quantifiers can be applied to the non-Quantifiers. An example, of how the "Negation" Quantifiers arising in a sentence can interact at governing nodes, is presented in section 5.4 ("Example Negation Propagation").

The third rule is that if a concept-value pair does propagate from a parse structure node "n" to another node "x," "x" receives a copy of the same RLI value as "n" (i.e., no attenuation or amplification is applied to the propagated value).

Once Quantifier propagation has been completed, any Quantifier concept-value pair, at a non-governing node, is deleted (see pseudocode of FIG. 6B, lines 13 to 18).

Figure 10E:
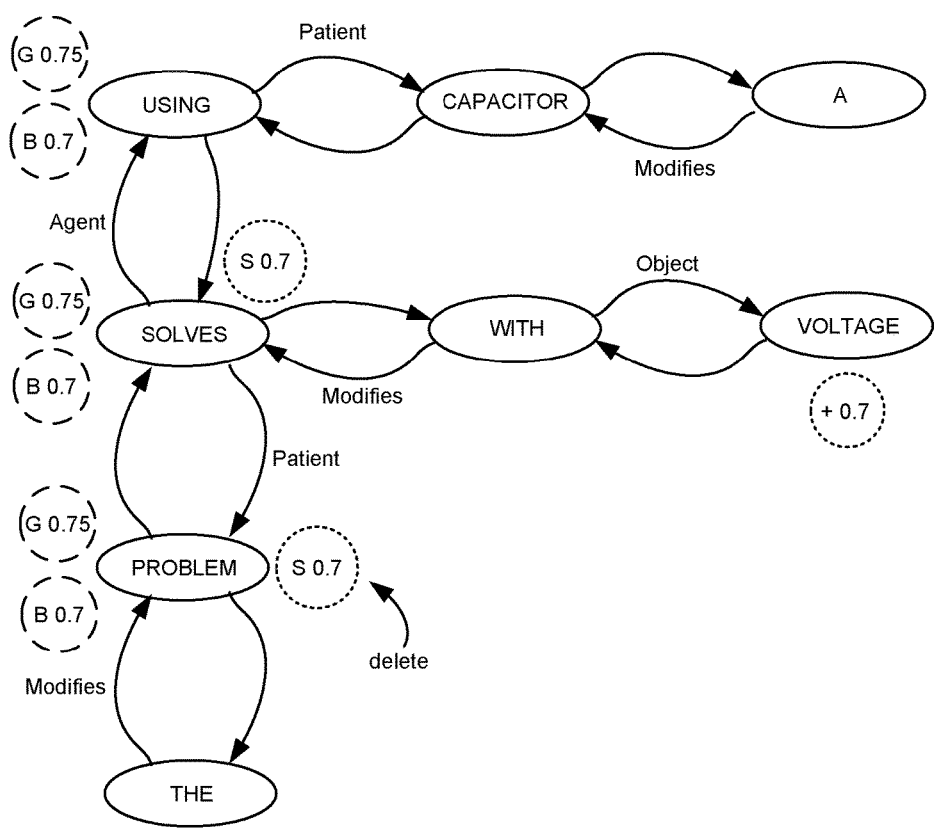
FIG. 10E depict the example parse structure of FIG. 10D after Quantifier propagation.

For the example of FIG. 10, a full propagation, of the Quantifier concept-value pairs, is shown in FIG. 10E. As can be seen, the only difference, between FIGS. 10D and 10E, is that a copy of ("Solution," 0.7) has been propagated from "problem" to "solves." For FIG. 10E, "solves" and "voltage" are governing nodes. The node "solves" is a governing node because the concept-value pair at "problem" could propagate no further once it reached "solves." The node "voltage" is a governing node because the concept-value pair at "voltage" could not propagate from "voltage." FIG. 10E also indicates that the concept-value pair at "problem" is to be deleted since "problem" is a non-governing node.

2.2.4. Determine Quantifier Values

Once the Quantifier concept-value pairs have been fully propagated, the determination of the set of final Quantifier concept-value pairs, that will be used to modify any non-Quantifier concept-value pairs at each node "n," can be accomplished as follows. In order to explain this process, it is helpful to divide the set of Quantifier concepts into two parts: those that do not perform any type of negation (the non-negation Quantifiers) and those that do perform some type of negation (the negation Quantifiers). An example division of Quantifier concepts, into the negation and non-negation types, is indicated by the column "Quantifier Type" of FIG. 9E.

2.2.4.1. Non-Negation Quantifiers
2.2.4.1.1. Sum Values on Per-Concept Basis The following can then be performed at each governing node "n." For each non-negation Quantifier, "Non_Neg_Q," that is represented at "n" by a set "s" of two or more concept-value pairs, replace "s" with a single concept-value pair where the concept is "Non_Neg_Q" and the value is the sum of the values from the pairs of "s."

This process is illustrated, in more detail, in FIG. 6B, lines 21-30. The first (outermost) loop, that begins at line 21, iterates over each governing node "n" of parse structure "T." The second loop, that begins at line 22, iterates over each type of non-negation Quantifier for which there is one or more concept-value pairs at "n." Example types of non-negation Quantifiers, for iteration over, include those listed in FIG. 9E with the value "Non-Negation" in the "Quantifier Type" column. The third (innermost) loop, that begins at line 24, iterates over each concept-value pair, at node "n," where the concept is of the type specified by the second loop. Each concept-value pair, iterated over by the third loop, is referred to as "NNQ_cvp." Each "NNQ_cvp" is removed from node "n" (line 26). The sum of the value portion, of all concept-value pairs "NNQ_cvp," is accumulated as "sum1" (line 25). Once the third loop finishes, a concept-value pair is added to node "n" where the concept portion is determined by the current value of "NNQ_type" and the value portion is determined by the value of "sum1" (line 28).

Since the example of FIG. 10E does not illustrate this situation, consider the following example that shall be referred to herein as "Example 1." Example 1 supposes that the concept-value pairs at a governing node "n" are the following: ("Intensify," 0.7), ("Intensify," 0.5), ("Increase," 0.7), ("Solution," 0.7), ("Solution," 0.5), ("Negation," 0.6), ("Good," 0.3), ("Bad," 0.6). Since there are two concept-value pairs with the same non-negation Quantifier (i.e., "Intensify"), they are replaced with a single concept-value pair whose concept is still "Intensify" but whose value is the sum of 0.7 and 0.5. Therefore, the resulting concept-value pairs at a node "n" are the following: ("Intensify," 1.2), ("Increase," 0.7), ("Solution," 0.7), ("Solution," 0.5), ("Negation," 0.6), ("Good," 0.3), ("Bad," 0.6).

2.2.4.1.2. Apply PLQ

The value portion "v," of each non-negation Quantifier concept-value pair, can be converted into a value, suitable for modifying non-Quantifier values, as follows. The value "v" can be used as an exponent (or "power") of a base value "b," where the base value is determined by the type of the Quantifier. This use of exponentiation is referred to as application of the "Power Law for Quantifiers" (PLQ).

This process is illustrated, in more detail, in FIG. 6C, lines 1-9. The first (outermost) loop, that begins at line 2, iterates over each governing node "n" of parse structure "T." The second (innermost) loop, that begins at line 3, iterates over each concept-value pair, at node "n," where there is only one concept-value pair, for each non-negation Quantifier concept type, because of the previous action of summing like concept-value pairs. Each concept-value pair, iterated over by the second loop, is referred to as "NNQ_cvp." The variable "exponent" is set to the value portion of NNQ_cvp (line 4). The variable "base" is set to the value dependent upon the type of non-negation Quantifier concept specified by the concept portion of NNQ_cvp (line 5). The new value, for the value portion of NNQ_cvp, is found by raising the value of "base" to the power determined by "exponent" (line 6). This new value then replaces the current value for NNQ_cvp (line 7).

An example mapping, from Quantifier type to base value, is shown in FIG. 9E. As can be seen from FIG. 9E, "Intensify" is treated, for purposes of PLQ calculation, just like an "Increase" operator. The distinction, in definition, between "Intensify" and "Increase" is not used herein. "Intensify" is defined to mean something more than the default value (e.g., the word "very" does this). "Increase" implies a time component to becoming more than the default value. "Diminish" and "Decrease" have an analogous relationship.

Figure 10F:
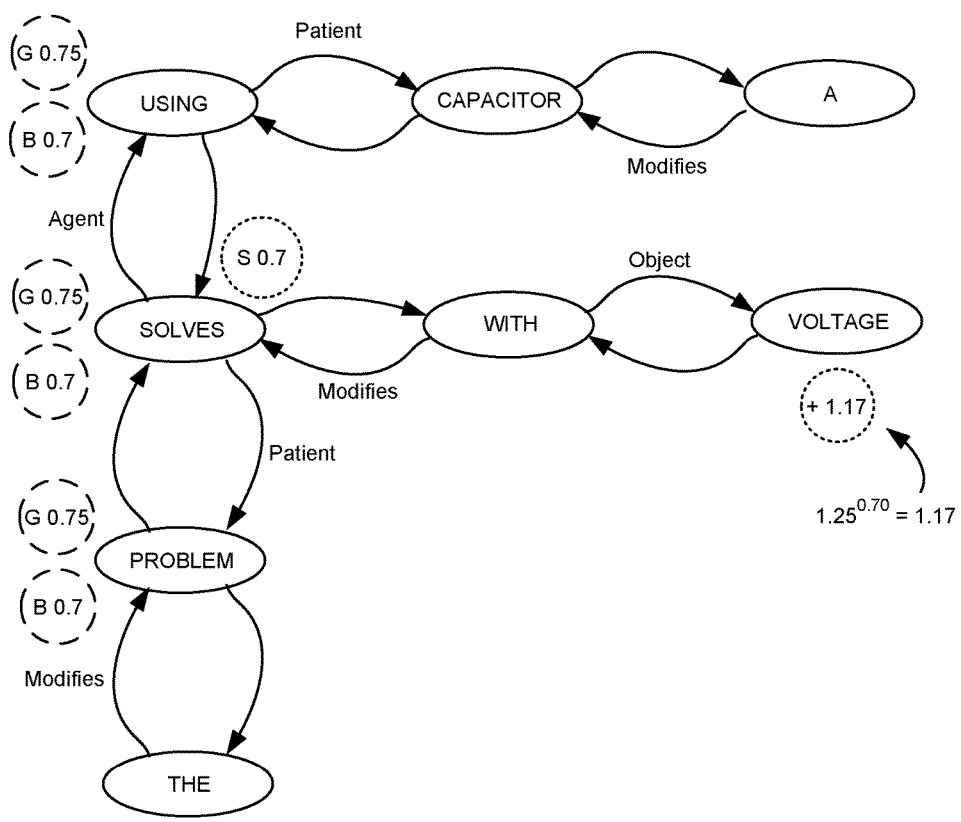
FIG. 10F depicts the example parse structure of FIG. 10E after application of the power law to the non-negation Quantifiers.

In the example of FIG. 10E, it can be seen that the only non-negation Quantifier concept-value pair is the one at the node for "voltage" where the pinnacle concept is "Intensify." From FIG. 9E, it can be determined that the base value "b" for "Intensify" is 1.25. In accordance with PLQ, the value of 0.7, at the node for voltage, is used as an exponent for 1.25 to produce the value 1.17. FIG. 10F is the same as FIG. 10E, except that PLQ has been applied to the concept-value pair of the "voltage" node.

For Example 1, application of PLQ produces the following result: ("Intensify," 1.31), ("Increase," 1.17), ("Solution," 0.7), ("Solution," 0.5), ("Negation," 0.6), ("Good," 0.3), ("Bad," 0.6).

2.2.4.2. Negation Quantifiers
2.2.4.2.1. Thresholding

The negation Quantifiers, at a governing node "n," can be converted, as follows, into a form suitable for scaling the non-Quantifier concept-value pairs at "n." The value portion, of each negation Quantifier concept-value pair at node "n," is thresholded to either 0 or 1. This step is shown in the pseudocode at FIG. 6C, lines 11-18. The threshold, which an indication of negation must be stronger than to be counted as a negation for purposes of modifying non-Quantifiers, depends upon the particular application. An example threshold is 0.4.

Figure 10G:
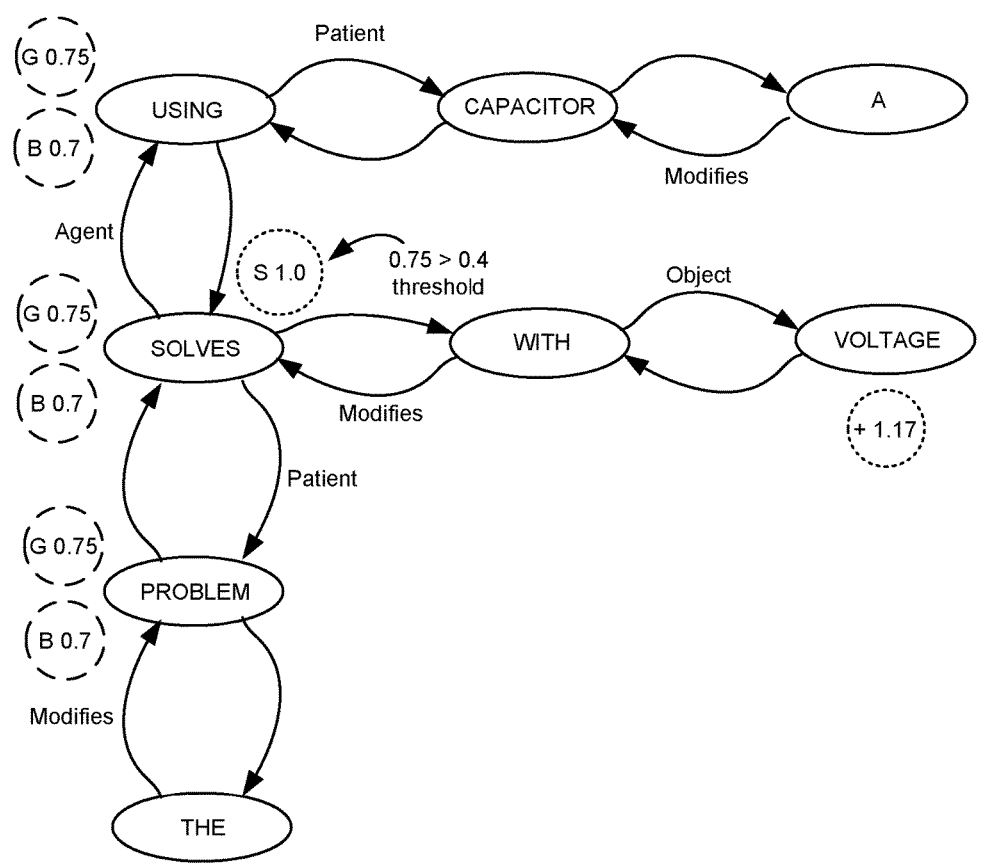
FIG. 10G depicts the example parse structure of FIG. 10F after application of thresholding to negation Quantifiers.

In the example of FIG. 10F, there is one negation Quantifier concept-value pair at a governing node: the concept-value pair at the "solves" node. FIG. 10G is the same as FIG. 10F, except that a threshold of 0.4 has been applied to this negation Quantifier concept-value pair. Application of the threshold to Example 1 results in the following: ("Intensify," 1.31), ("Increase," 1.17), ("Solution," 1.00), ("Solution," 1.00), ("Negation," 1.00), ("Good," 0.3), ("Bad," 0.6).

2.2.4.2.2. Sum Values on Per-Concept Basis

The following can then be performed at each governing node "n." For each type of negation Quantifier, "Neg_Q," that is represented at "n" by a set "s" of two or more concept-value pairs, replace "s" with a single concept-value pair where the concept is "Neg_Q" and the value is the sum of the values from the pairs of "s."

This process is illustrated, in more detail, in FIG. 6C, lines 20-31. The first (outermost) loop, that begins at line 21, iterates over each governing node "n" of parse structure "T." The second loop, that begins at line 22, iterates over each type of negation Quantifier for which there is one or more concept-value pairs at "n." Example types of negation Quantifiers, for iteration over, include "Negation" and "Solution" of FIG. 9E. The third (innermost) loop, that begins at line 24, iterates over each concept-value pair, at node "n," where the concept is of the type specified by the second loop. Each concept-value pair, iterated over by the third loop, is referred to as "NQ_cvp." The value portion of each NQ_cvp is extracted (line 25) and accumulated (line 26). Each "NQ_cvp" is removed from node "n" (line 27). Once the third loop finishes, a concept-value pair is added to node "n" where the concept portion is determined by the current value of "NQ_type" and the value portion is determined by the value of "sum1."

Since there is only one negation Quantifier concept-value pair at any node in FIG. 10G, the above-described step does not change FIG. 10G. However, application of the above-described step to Example 1 results in the following: ("Intensify," 1.31), ("Increase," 1.17), ("Solution," 2.00), ("Negation," 1.00), ("Good," 0.3), ("Bad," 0.6).

2.2.4.2.3. Apply PLQ

The value portion "v," of each negation Quantifier concept-value pair, can be converted into a value, suitable for modifying non-Quantifier values, as follows. As with the non-negation Quantifier concept-value pairs, an example way to accomplish this conversion is to use the Power Law for Quantifiers: the value "v" can be used as an exponent (or "power") of a base value "b," where the base value is determined by the type of the Quantifier. The base value is typically −1 so that an even number of negation Quantifiers produces +1 (that will not change the non-Quantifiers to which it is applied) and an odd number of negation Quantifiers produces −1 (that can "flip" the non-Quantifier, to which it is applied, to its correlative concept). An example mapping, from negation Quantifier type to base value, is shown in FIG. 9E.

This process is illustrated, in more detail, in FIG. 6D, lines 1-9. The first (outermost) loop, that begins at line 2, iterates over each governing node "n" of parse structure "T." The second (innermost) loop, that begins at line 3, iterates over each negation Quantifier concept-value pair, at node "n," where there is only one concept-value pair for each negation Quantifier concept type because of the previous action of summing like concept-value pairs. Each concept-value pair, iterated over by the second loop, is referred to as "NQ_cvp." The variable "exponent" is set to the value portion of NQ_cvp (line 4). The variable "base" is set to the value dependent upon the type of negation Quantifier concept specified by the concept portion of NQ_cvp (line 5). The new value, for the value portion of NQ_cvp, is found by raising the value of "base" to the power determined by "exponent" (line 6). This new value then replaces the current value for NQ_cvp (line 7).

Figure 10H:
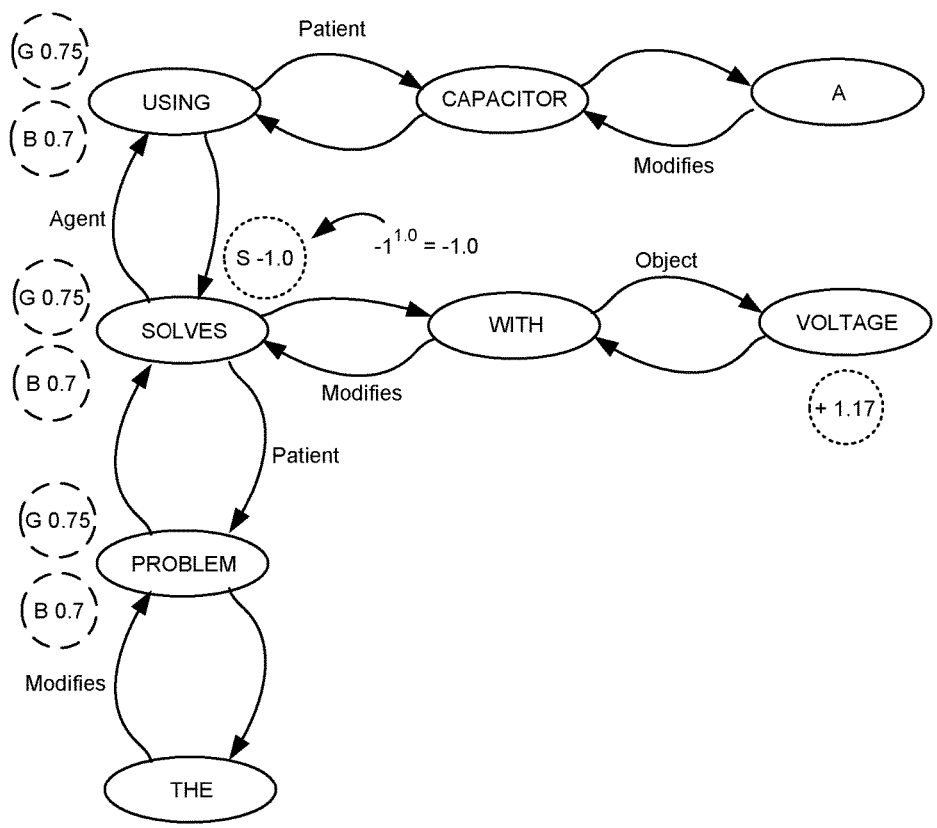
FIG. 10H depicts the example parse structure of FIG. 10G after application of the power law to the negation Quantifiers.

In the example of FIG. 10G, it can be seen that there is one negation Quantifier concept-value pair: the pair at the node for "solves." For this concept-value pair, the negation Quantifier is of type "Solution." From FIG. 9E, it can be determined that the base value "b" for "Solution" is −1. In accordance with the Power Law for Quantifiers, the value of 1.0, at the node for "solves," is used as an exponent for −1 to produce the value −1. FIG. 10H is the same as FIG. 10G, except that the Power Law of Quantifiers has been applied to the concept-value pair of the "solves" node. For Example 1, the double negative for "Solution" and single negative for "Negation" produce, respectively, values of +1 and −1. Example 1 results in the following: ("Intensify," 1.31), ("Increase," 1.17), ("Solution," 1.00), ("Negation," −1.00), ("Good," 0.3), ("Bad," 0.6).

2.2.5. Quantifier Back Propagation

Back propagation allows the net effect of Quantifiers, whose net effect was able to be determined because of central collection at governing nodes, to be applied at all relevant nodes with non-Quantifiers.

Each concept-value pair of "T," where the concept is of type Quantifier, can be back propagated through "T" as follows. The step of back propagation is invoked in the pseudocode at FIG. 6D, line 21. Three main rules, for Quantifier back propagation, are shown in the pseudocode comments of FIG. 6D at lines 12-20. This step is called "back" propagation because it is, essentially, the reverse of the Quantifier propagation described above (see section 2.2.3 "Quantifier Propagation").

The first rule, of Quantifier back propagation, is that the same as the first rule of Quantifier propagation: the propagations of each concept-value pair are kept separate.

The second rule, of Quantifier back propagation, is essentially a reversal of the second rule of Quantifier propagation. A concept-value pair, at a particular parse structure node "n," can only propagate to another node "x" if there is an edge from "n" to "x" and that edge is one of three types: "n" represents a verb "v" and "x" is the agent of "v;" "n" represents a verb "v" and "x" is the patient of "v;" or "x" represents a modifier and "n" is what "x" modifies. The principle behind the second rule is as follows: propagate each concept-value pair, at a governing node "n," to each other node "x" that is governed by "n." The definition of "governing" node is presented above (see section 2.2.3 "Quantifier Propagation").

The third rule is that if a concept-value pair does propagate from a parse structure node "n" to another node "x," "x" receives a copy of the same RLI value as "n" (i.e., no attenuation or amplification is applied to the propagated value).

Figure 10I:
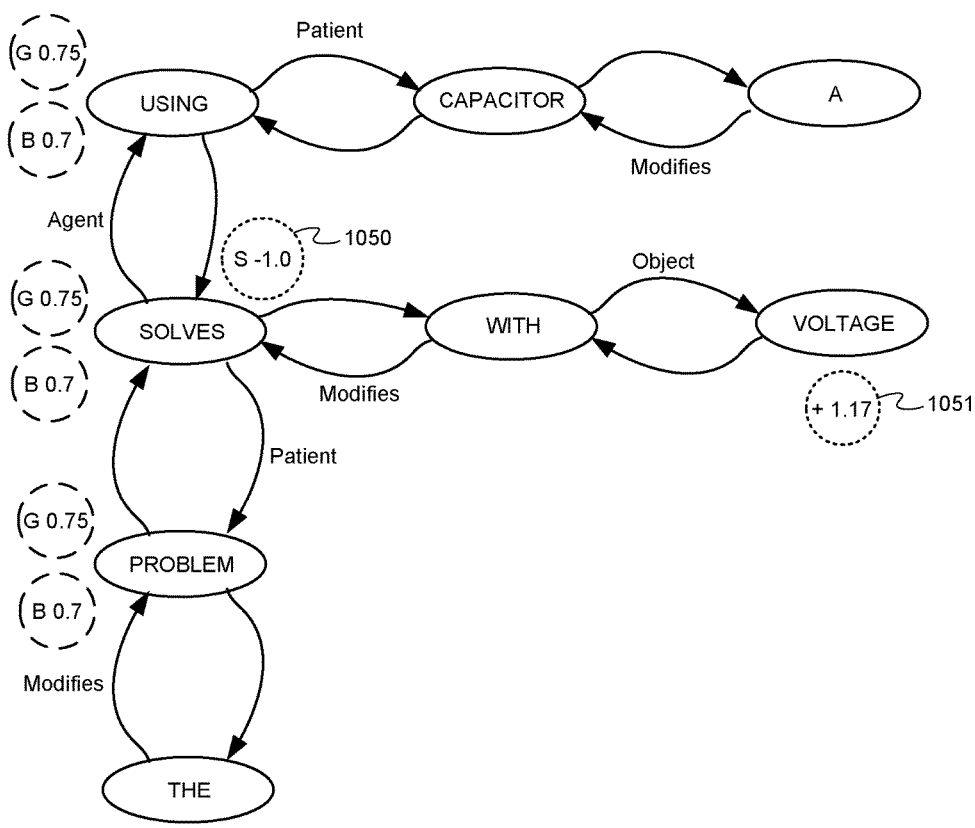
FIG. 10I depicts, for the example, the assignment of a unique ID to each Quantifier concept-value pair.
Figure 10J:
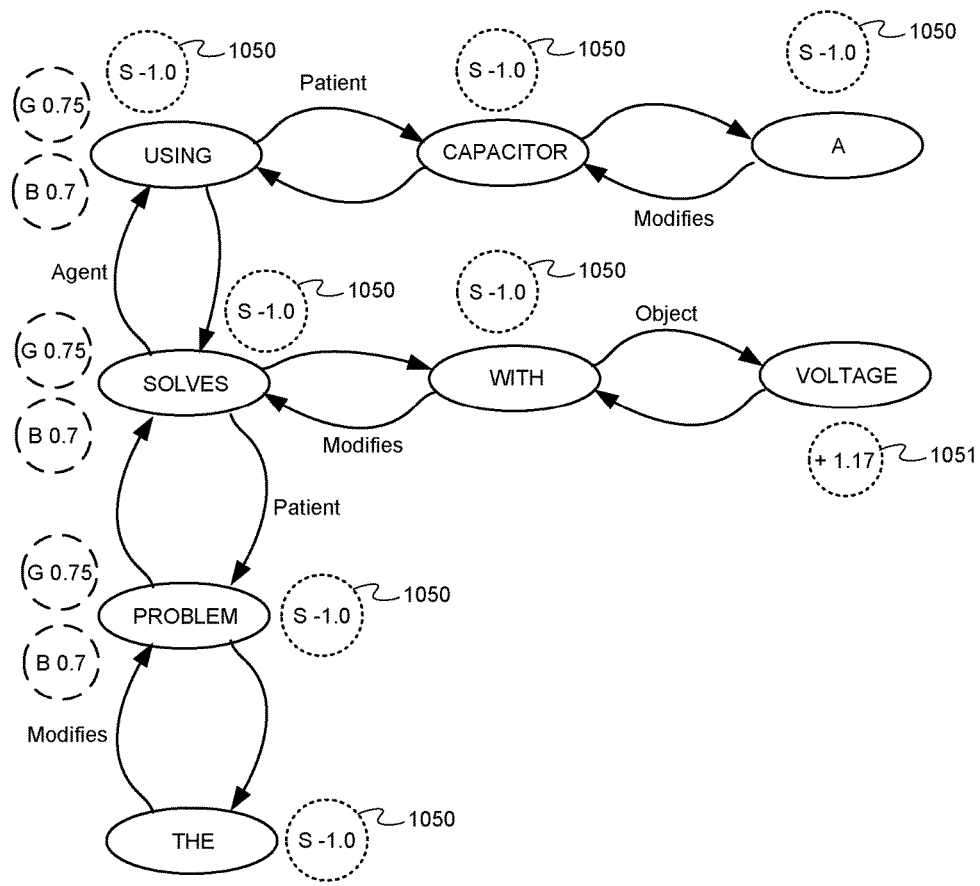
FIG. 10J depicts, for the example, back propagation of each Quantifier concept-value pair.

For the example of FIG. 10H, a back propagation, of the Quantifier concept-value pairs, proceeds as follows. In FIG. 10I, the concept-value pair for "Solution" is given the unique identifier 1050 and the concept-value pair for "Intensify" is given the unique identifier 1051. In FIG. 10J, concept-value pairs 1050 and 1051 have been fully back propagated.

2.2.6. Scale Non-Quantifier Values with Quantifier Values

For each node, the Quantifier values can be used to scale the corresponding non-Quantifier values. This operation is described in the pseudocode of FIG. 6E, line 1 to 6F, line 30. Each scaled non-Quantifier value is referred to herein as a "derived non-Quantifier value" or DNV.

The determination of DNVs is a two-part process for each node. The first part is the determination of the scaling factors. A scaling factor can be a product of the value portions of Quantifier concept-value pairs. If a node has no Quantifier concept-value pairs, the default scaling factor is 1.0.

Two scaling factors are determined in FIG. 6E at lines 4-14. The first scaling factor (referred to in the pseudocode as "solution_scaling_factor") includes the value (if any) for the Quantifier "Solution." The pseudocode presents this determination at lines 4-8. "Solution" differs from "Negation" as follows: "Solution" can only "flip" (or invert) a reference to "Bad" into a reference to "Good," while "Negation" can invert any non-Quantifier concept into its correlative concept. The second scaling factor (referred to in the pseudocode as "general_scaling_factor") does not include the value (if any) for the Quantifier "Solution." The pseudocode presents this determination at lines 10-14.

The second part, of the DNV determination process, is the scaling, by the appropriate scaling factor, of the value portion of each non-Quantifier concept-value pair at a node "n." Since "Solution" only applies to "Bad," the "solution_scaling_factor" is only applied to those concept-value pairs where the concept is "Bad." For all other concept-value pairs, other than "Bad," the general_scaling_factor is applied.

If the scaling factor is a negative number (which will happen whenever an odd number of negations are determined to apply to the unit represented by a parse structure node), scaling of a non-Quantifier concept-value pair "NQ_cvp" can be handled as follows, so long as the concept "C," of "NQ_cvp," has a correlative concept that we shall refer to as "−C." Assume "NQ_cvp" has a scaling factor s, where s is set to "solution_scaling_factor" if "C" is "Bad" or s is otherwise set to "general_scaling_factor." Further assume that the magnitude of the value portion of "NQ_cvp" is "m." The absolute value of the product s×m becomes the scaled value for "NQ_cvp," but the concept is changed from "C" to "−C." Other than for the concepts "Good" and "Bad," if there is a pre-existing concept-value pair "corr_NQ_cvp" for "−C," its value portion is also scaled by s and its concept is inverted from "−C" to "C."

If, however, "C" is "Good" or "Bad," and if there is a pre-existing concept-value pair "corr_NQ_cvp" for "−C," its scaling factor "s_corr" may be a positive number. In this case, as a result of scaling, "NQ_cvp" and "corr_NQ_cvp" can end-up representing the same concept "−C." This situation is handled by only keeping the concept-value pair with the larger scaled value.

Regardless of whether the scaling value is negative or not, the result of scaling can be to set the value, of a non-Quantifier concept-value pair, to a value greater than a maximum permissible value (e.g., greater than 1.0). In this case, the value can be replaced with exactly the maximum permissible value (e.g., 1.0).

The scaling process is described in more detail in the pseudocode of FIG. 6F at lines 1-29. The process operates as follows.

Each concept-value pair "NQ_cvp" is iterated over (line 1).

If the concept of "NQ_cvp" is "Bad," the scaling factor "scaling_factor" is set to "solution_scaling_factor" and is otherwise set to "general_scaling_factor" (lines 3-6).

The value portion of each pair is extracted (line 8), scaled (line 9) and replaces the pre-scaled value of "NQ_cvp" (line 10).

If the value portion of NQ_cvp is greater than or equal to zero, the scaling process is complete (except for, possibly, limiting the scaled value to be less than or equal to a maximum value).

If, however, the value portion of NQ_cvp is less than zero (tested for by line 12), the following steps can be taken. The value portion of NQ_cvp is replaced with its absolute value (line 13) and the concept portion of NQ_cvp is changed to indicate the correlative concept (line 14). As long as the concept of NQ_cvp is not "Good" or "Bad" these steps are sufficient since if there is a pre-existing concept-value pair for the correlative concept, when it is iterated over (by the loop of line 1) its concept will also be inverted.

The "if" of lines 16-17 tests whether the concept of "NQ_cvp" is "Good" or "Bad" and if the scaling factor for the correlative concept is of an opposite sign. If this test is satisfied it is known that if there is a pre-existing concept-value pair (referred to as "pe_NQ_cvp") for the correlative concept, when it is iterated over (by the loop of line 1) its concept will not be inverted. This results in two concept-value pairs for the same concept. This is handled by keeping only the concept-value pair whose value portion is greater (lines 23-26).

Figure 10K:
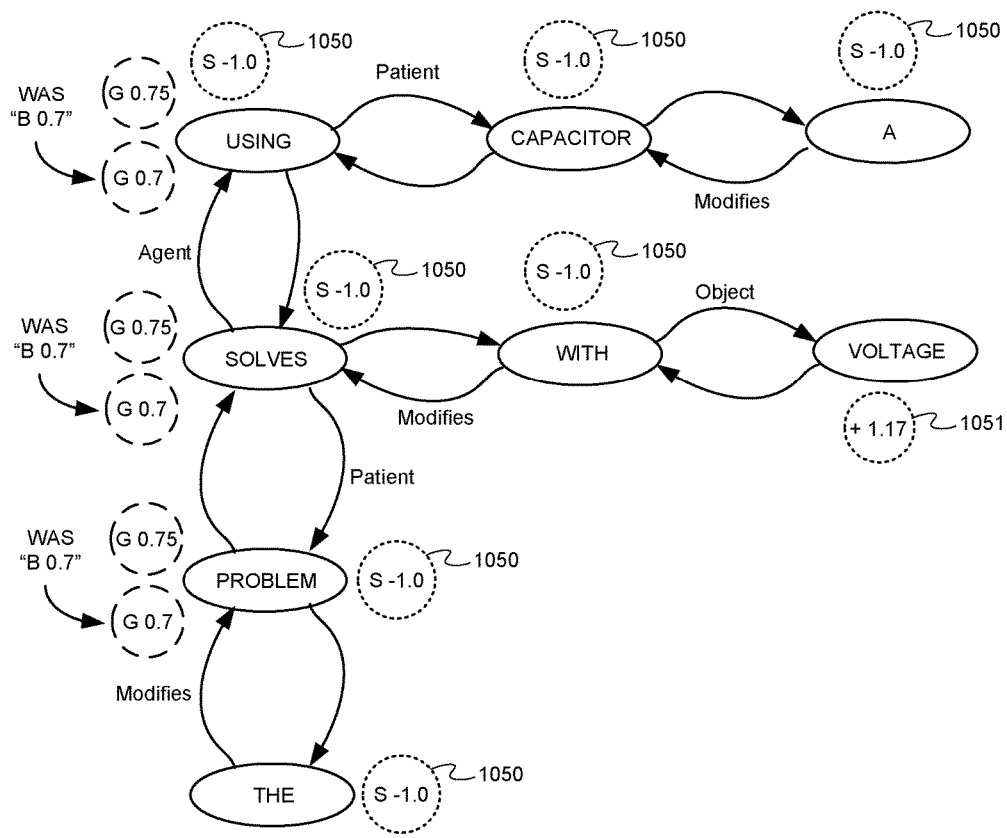
FIG. 10K depicts, for the example, scaling of the non-Quantifiers with the Quantifiers.

FIG. 10K shows the result of scaling the non-Quantifier values of FIG. 10J. As can be seen, for nodes "using," "solves" and "problem," the Quantifier "Solution" converts each non-Quantifier "Bad" to the non-Quantifier "Good" with the same value of 0.7.

Example 1 was last determined to consist of the following concept-value pairs: ("Intensify," 1.31), ("Increase," 1.17), ("Solution," 1.00), ("Negation," −1.00), ("Good," 0.3), ("Bad," 0.6). Because "Solution" has the value 1.00, the scaling factor, with or without solution, is the same: 1.31× 1.17×−1.00=−1.53. Example 1, after scaling its non-Quantifier concept-value pairs by 1.53, is as follows: ("Intensify," 1.31), ("Increase," 1.17), ("Solution," 1.00), ("Negation," −1.00), ("Bad," 0.46), ("Good," 0.92).

2.2.7. Propagate Non-Quantifiers

Non-Quantifier value propagation is invoked in the pseudocode at FIG. 6G at line 8. The rules for non-Quantifier value propagation are shown in the pseudocode comments of FIG. 6G at lines 1-7. As can be seen, there are three main rules.

The first rule is that the propagations, of each non-Quantifier concept-value pair, are kept separate.

The second rule is as follows. A concept-value pair, at a particular parse structure node "n," can propagate to another node "x" so long as there is an edge from "n" to "x;" the type of edge, from "n" to "x," does not matter. The general principle, behind the second rule, is as follows. When part of a sentence has been determined to refer to a non-Quantifier because it is recognized as a linguistic feature, the rest of the sentence is regarded as also referring, to some degree, to that non-Quantifier.

The third rule is as follows. If a non-Quantifier concept-value pair does propagate, from a parse structure node "n" to another node "x," "x" receives a copy, of the concept-value pair, where the value portion has been attenuated. An example way of achieving attenuation is to multiply the value portion, of the concept-value pair for "n," by an attenuation coefficient. The attenuation coefficient will have a value less than 1.0. The general principle, behind the third rule, is as follows. The rest of a sentence, relative to a linguistic feature that caused a non-Quantifier to be initially recognized, is regarded as referring to that Quantifier to a degree inversely proportional to its distance from the linguistic feature.

Continuing with Example 1, assume that non-Quantifier propagation adds non-Quantifier concept-value pairs, to the node represented by Example 1, as follows: ("Intensify," 1.31), ("Increase," 1.17), ("Solution," 1.00), ("Negation," −1.00), ("Good," 0.3), ("Good," 0.92), ("Bad," 0.46).

2.2.8. Select Maximum Non-Quantifiers

Once the non-Quantifier concept-value pairs have been fully propagated, the determination of the set of final non-Quantifier concept-value pairs, at each node "n," can be accomplished as follows.

The following can then be performed at each node "n." For each type of non-Quantifier, "Non_Q," that is represented at "n" by a set "s" of two or more concept-value pairs, replace "s" with a single concept-value pair where the concept is "Non_Q" and the value is the maximum of the values from the pairs of "s."

This process is illustrated, in more detail, in FIG. 6G, lines 10-20. The first (outermost) loop, that begins at line 11, iterates over each node "n" of parse structure "T." The second loop, that begins at line 12, iterates over each type of non-Quantifier for which there is one or more concept-value pairs at "n." Example types of non-Quantifiers, for iteration over, include "Good" and "Bad" of FIG. 9D. The third (innermost) loop, that begins at line 14, iterates over each concept-value pair, at node "n," where the concept is of the type specified by the second loop. Each concept-value pair, iterated over by the third loop, is referred to as "NQ_cvp." Each "NQ_cvp" is removed from node "n" (line 16). The maximum value portion, of all concept-value pairs "NQ_cvp," is accumulated as "max1" (line 15). The function "find_max," of line 15, is defined to return the maximum value of its two arguments: the current value of "max1" and the value portion of "NQ_cvp." Once the third loop finishes, a concept-value pair is added to node "n" where the concept portion is determined by the current value of "NQ_type" and the value portion is determined by the value of "max1" (line 18).

Figure 10L:
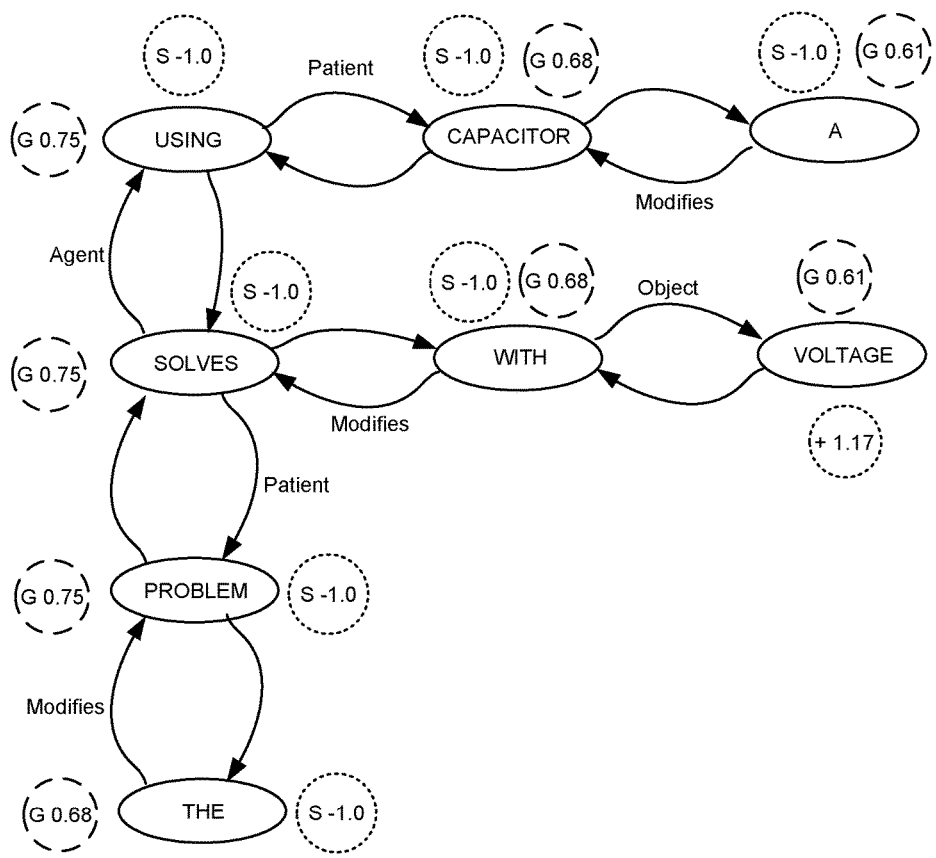
FIG. 10L depicts, for the example, the results of propagating non-Quantifier concept-value pairs and keeping, at each node for each concept, the concept-value pair of maximum value.

FIG. 10L depicts the result of both (i) propagating the non-Quantifier concept-value pairs of FIG. 10K and (ii) selecting, for each node non-Quantifier concept represented at each node, the single concept-value pair with the greatest value. FIG. 10L is based upon using an attenuation coefficient of 0.9, and rounding each application of the attenuation coefficient to two decimal places, when propagating the non-Quantifier concept-value pairs of FIG. 10K. Continuing with Example 1, selecting the maximum produces the following: ("Intensify," 1.31), ("Increase," 1.17), ("Solution," 1.00), ("Negation," −1.00), ("Good," 0.92), ("Bad," 0.46).

2.2.9. Summary

The general structure of the process, presented in section 2.2 ("Pseudocode and Example") through the pseudocode, is summarized by FIG. 2B.

The step of parsing, described above in section 2.2.1 ("Parse"), is represented in FIG. 2B by step 210.

The step of parse structure population, described above in section 2.2.2 ("Populate Parse Structure"), is represented in FIG. 2B by step 211.

Once parse structure "T" has had concept-value pairs assigned to it in accordance with step 211 of FIG. 2B, there are three main process "tracks" that can be performed. The first track, represented in FIG. 2B by the column of steps 220-222, relates to processing those concept-value pairs where the concept is of type non-negation Quantifier. The second track, represented in FIG. 2B by the column of steps 230-234, relates to processing those concept-value pairs where the concept is of type negation Quantifier. The third track, represented in FIG. 2B by the column of steps 240-242, relates to processing those concept-value pairs where the concept is of type non-Quantifier. As can be seen, the first and second tracks can proceed, at least to a certain extent, independently of each other. The first track can proceed to completion, at step 222, independently of the state of the second track. The second track can proceed to completion, at step 234, independently of the state of the second track.

The first track operates as follows. Step 220 propagates through "T" those concept-value pairs where the concept is a non-negation Quantifier. This step is addressed in above section 2.2.3 ("Quantifier Propagation"). Step 221 applies when, for each node of "T," there are two or more concept-value pairs that relate to a single non-negation Quantifier. An approach to combining concept-value pairs, that share a common concept, is described in above section 2.2.4.1.1 ("Sum Values On Per-Concept Basis"). Step 222 applies a function, to each concept-value pair at a node, to transform the value portion of each into a value appropriate for scaling other concept-value pairs. An example function, called the "Power Law for Quantifiers" is described in above section 2.2.4.1.2 ("Apply PLQ").

The second track operates as follows. Step 230 propagates through "T" those concept-value pairs where the concept is a negation Quantifier. This step is addressed in above section 2.2.3 ("Quantifier Propagation"). Prior to combining concept-value pairs that share a common negation Quantifier concept (step 233), each such pair can thresholded (by step 232). An approach to the thresholding of step 232 is described in above section 2.2.4.2.1 ("Thresholding").

Step 233 applies when, for each node of "T," there are two or more concept-value pairs that relate to a single negation Quantifier. An approach to combining concept-value pairs, that share a common concept, is described in above section 2.2.4.2.2 ("Sum Values On Per-Concept Basis").

Step 234 applies a function, to each concept-value pair at a node, to transform the value portion of each into a value appropriate for scaling other concept-value pairs. An example function, called the "Power Law for Quantifiers" is described in above section 2.2.4.2.3 ("Apply PLQ").

The Quantifier values produced by steps 222 and 234 can be back propagated (step 235) such that all relevant nodes, with non-Quantifier values, can have their non-Quantifier values scaled (at step 240). Back propagation is addressed in above section 2.2.5 ("Quantifier Back Propagation") and scaling is addressed in above section 2.2.6 ("Scale Non-Quantifier Values With Quantifier Values").

Step 241 propagates through "T" those concept-value pairs where the concept is a non-Quantifier. This step is addressed in above section 2.2.7 ("Propagate Non-Quantifiers"). Step 242 applies when, for each node of "T," there are two or more concept-value pairs that relate to a single non-Quantifier. An approach to combining concept-value pairs, that share a common concept, is described in above section 2.2.8 ("Select Maximum Non-Quantifiers").

3. CONCEPT-BASED AND KEYWORD-BASED SEARCH, PSEUDOCODE

The pseudocode presented in this section describes a combined concept-based and keyword-based search system. It is organized into three main phases: indexing (FIG. 4), query accepting (FIG. 5A) and keyword-based searching (FIG. 5B). A discussion of a production environment computer system, for executing these phases, is described in section 5.3 ("Production Environment").

Phase 1 (indexing) can be performed independent of whether a user has requested a search. Since indexing can be performed on a large body of data, and can require periodic updating, it can be appropriate to execute such procedures on separate computing hardware from that which responds to user queries. Indexing can also be performed, for example, at times (e.g., at night or on weekends) when searches are not being run.

Keyword-searching (phase 3) happens in response to entry of a user query during query-accepting (phase 2).

3.1. Indexing

As discussed above, any type of computer-accessible content can serve as input to the indexing phase, so long as the input data represents a collection of natural language discourse. This section presents, for purposes of example, a database (i.e., the "input database") as the source of data to be indexed.

An example input database is discussed above in Section 1.3.1 ("New Uses For An Existing Technology").

The output of phase 1 is one or more Concept-Based DBs (CBDBs). For example the CBDBs produced can include CBDB ("Good") and CBDB ("Bad").

Each document, of the input database, is iterated over. FIG. 4, line 1.

Each sentence, within each document, is iterated over. FIG. 4, line 2.

Each sentence is parsed and classified according to which pinnacle concepts it asserts. FIG. 4, line 7. This parsing and classification can be accomplished in accordance with the procedure "sentence_classify" that was described in above section 2 ("Concept-Based Classification"). The results returned (referred to as "result_parse"), from parsing and classification, can be in any suitable form. A suitable form is as a parse structure, where each node is representative of a structural unit of the input sentence. A suitable level of structural representation, for each node of the parse structure, can be to represent a lexical unit of the input sentence.

Each pinnacle concept, that is to be the organizing concept for a CBDB, is iterated over. FIG. 4, line 12.

Each node of result_parse can be accessed for a reference level with which it asserts the current pinnacle concept ("PC_curr") at issue (line 14). This is accomplished by iterating over each node of result_parse (see line 13) and by accessing each node by the current pinnacle concept PC_curr. This accessing can be accomplished by finding the concept-value pair, at node NU_curr and for concept PC_curr, and retrieving the "value" portion of that concept-value pair.

If, for PC_curr, the reference level value of NU_curr is above a certain predetermined threshold (see line 15), then a snippet ("snippet_curr") is formed (see line 18) that includes S_curr. "snippet_curr" is added to the appropriate CBDB, and it is indexed for later keyword-based searching (see line 28).

As an efficiency measure, for a later "ranking" phase, classification results can be stored with the newly-formed snippet (i.e., "snippet_curr"). FIG. 4, lines 25-26. Specifically, for each sentence "s" that forms snippet_curr, its parse and classification results (i.e., the result of applying "sentence_classify" to "s") can be stored with it. For the sentence of snippet_curr that corresponds to S_curr, this involves storing with such sentence a copy of results_parse. For each other sentence "s," of which snippet_curr is formed, it is assumed (according to processes not illustrated in the pseudocode) that its parse and classification results are available for caching with snippet_curr (any suitable scheme, for making such parse and classification results available, can be used).

3.2. Query Accepting

In the query accepting phase, the user selects a CBDB to be searched (FIG. 5A, line 5) and enters a keyword-based search (FIG. 5A, line 7) for that CBDB. The CBDB selected is referred to, in the pseudocode, as "CBDB_curr." The keyword-based search is referred to, in the pseudocode, as the current Input Query (or "IQ_curr").

3.2.1. Query Form

While any known form of keyword-based query can be used, an example hierarchical form, for IQ_curr, is presented in this section. The query form presented in this section has been found to be a particularly useful way to express queries for the search of a concept-based database (CBDB).

The largest unit, within IQ_curr, can be referred to as a "page." Each page is related to any other pages of IQ_curr by a logical OR, meaning that a snippet, of CBDB_curr, can satisfy IQ_curr if it satisfies any combination of one or more pages.

Each page can be comprised of one or more query terms. Each query term can be comprised of two parts: a keyword-specification and a requirement status.

The keyword-specification specifies one or more keywords that are to be searched for in each snippet. The keywords, of a keyword-specification, acts together according to a logical OR: a snippet can satisfy a query term so long as the snippet contains any combination of one or more of the keywords. The keywords, of a keyword-specification, can be separated by commas.

Possible values, for the requirement status portion of a query term, are: Required, Optional, or Excluded. "Required" means that, in order for a snippet to satisfy a page, such snippet must satisfy all query terms with a "Required" requirement status. "Optional" means that, in order for a snippet to satisfy a page, such snippet need not satisfy any query terms with an "Optional" requirement status. However, during a ranking phase, of the keyword-based search results, satisfaction of Optional query terms can increase the ranking of a snippet in the search results. "Excluded" means that, in order for a snippet to satisfy a page, such snippet must not satisfy any query terms with an "Excluded" requirement status.

3.2.2. Page Usage Techniques

A page "p" is generally written such that any snippet "s," that satisfies "p," is likely to be of interest to the user for his or her particular search topic. Further, within a satisfied page "p," the more query terms that are satisfied, the more likely "s" is to be of interest to the user.

When searching for new uses of an existing technology (which can also be called the seeking of "out-licensing" opportunities), each snippet "s," that satisfies at least one page of the search query, can be characterized as describing a "problem," or an "application" situation, for which the existing technology is likely to be useful.

When searching for a technology to address an existing problem (which can also be called the seeking of "in-licensing" opportunities), each snippet "s," that satisfies at least one page of the search query, can be characterized as describing a "benefit," or a "solution," that is likely to be useful in addressing the existing problem.

3.2.3. Example Query

FIG. 8A depicts an example query IQ_curr where the searcher has an existing technology, for making batteries last longer, and would like to find potential licensees.

As discussed above, in section 1.3.1 ("New Uses For An Existing Technology"), for this type of search topic, it is appropriate to search CBDB ("Bad") since one who is having some kind of problem is likely to be interested in purchasing a solution to that problem.

An appropriate keyword-based search, of CBDB ("Bad"), can limit the snippets retrieved to ones that address problems with batteries. FIG. 8A depicts a single example search page 800 that is comprised of query terms 810 to 813. As can be seen, query terms 810 to 812 are required, while query term 813 is optional.

Query term 810 requires any retrieved snippet to mention either "electricity" or the word "battery" as a noun (indicated by the "//n"). Query term 811 requires any retrieved snippet to mention either "out of power" or the phrase "burn out" where "burn" is a verb (indicated by the "//v"). Query term 812 requires any retrieved snippet to mention "last" as a verb (indicated by the "//v").

Query term 813 means that, among snippets that satisfy query terms 810 to 812, those that also mention either "portable" or "hand-held" will be ranked higher in the results presented to the user.

3.3. Keyword-Based Searching

Once a keyword-based query IQ_curr has been entered, a keyword search, of CBDB_curr, can be accomplished as follows (pseudocode for this process is shown in FIG. 5B).

First, it may be necessary to convert IQ_curr into a format that can be processed by the application responsible for performing the keyword search. Any known application, that provides a keyword search capability compatible with the type of data storage used for CBDB_curr, can be used. An example type of keyword search application is the search engine. An example suitable keyword search engine is the open-source program "Lucene." Lucene is provided by the Apache Software Foundation, Forest Hill, Md., U.S.A. A form of IQ_curr, that is suitable for input to a keyword search application, can be referred to as IQ_curr_logical. Production of IQ_curr_logical is shown in the pseudocode at FIG. 5B, line 3.

Second, IQ_curr_logical is applied to a keyword search engine. FIG. 5B, line 7. A keyword search engine selects snippets, from CBDB_curr, that meet the logical requirements of the IQ_curr_logical (e.g., at least one field is present for each required term, and no excluded fields are present).

In addition to selecting snippets that meet the logical requirements of the input query, a keyword search engine can also assign a score to each snippet (referred to herein as a "snippet_score"). The magnitude of each score can be proportional to how well a snippet meets the logical requirements. Scoring can accomplished with a formula that emphasizes prevalence (i.e., number of times a search term appears in snippet) of the search terms. In the pseudocode of FIG. 5B, the output of the keyword search engine is called "logically_scored_snippets."

Once each snippet has been assigned a snippet_score, the snippets resulting from the keyword-based search can be ranked, and displayed to the user, according to decreasing snippet_score value. FIG. 5B, line 10. To prevent the list of displayed snippets from being too long, it can be truncated at a predetermined maximum number of snippets (e.g., 5000).

The list of displayed snippets can be displayed to the user by any suitable technique. The amount of text presented to a user, for each snippet of the displayed list, can vary depending upon the such factors as: the number of snippets obtained and the amount of time a user wishes to spend considering each search result. For example, the user can be presented with a list of the snippets themselves. For each snippet of the displayed list, a link to the document, from which the snippet was produced, can also be displayed. The user can read snippets of the displayed list and decide which are actually worthy of further investigation. For each snippet the user wishes to investigate further, the user can select the link to the document from which the snippet was produced.

Alternatively, rather than presenting the snippets themselves in the displayed list, a further condensation of each snippet can be generated (e.g., a representative "title" can be generated for each snippet) and a list of those condensations displayed to the user.

4. CONCEPT-BASED RANKING

4.1. Overview

The results of the keyword-based search of step 112, of FIG. 1B, can be better ranked, as part of step 113, through the use of concept-based ranking. In general, however, concept-based ranking can be applied to the output of any type of search process. Concept-based ranking relies on the input query, of step 111, having pinnacle concept properties specified for some of the keyword-based search terms.

For example, FIG. 8B depicts the same query of FIG. 8A, except that a concept property has been added to each query term. Query term 821 (QT 821) specifies that a match is preferred if it is to a part (or sub-unit) of a snippet that has been classified (e.g., by "sentence_classify") as asserting the "Bad" concept. Similarly, QT 822 specifies that a match is preferred if it is to a sub-unit of a snippet that has been classified as referring to the "Good" concept. QT 820 and QT 823 specify that a match is given no preference based upon what concept the matching sub-unit of the snippet refers to.

An example procedure, for implementing concept-based ranking, is presented in FIGS. 5C and 5D. This procedure can be accomplished in-between the steps of applying a keyword search application (e.g., line 7 of FIG. 5B) and the display of the scored snippets to the user (e.g., line 10 of FIG. 5B) as discussed above in section 3 ("Concept-Based and Keyword-Based Search, Pseudocode").

The overall structure of the procedure is as follows. Each snippet, of the keyword-based results, is iterated over (FIG. 5C, line 3) and assigned a score ("snippet_score" at line 14 of FIG. 5D) based on correspondence between concept properties of the input query and concept properties of each snippet that matches the query. The concept-based component, of snippet_score, is determined by calling a procedure called "query_score." FIG. 5C, line 12. The other components, of snippet_score, can be based upon whether each snippet appears to be intended to be read by a human (rather than a computer). The procedures, for determining whether a snippet is intended to be read by a human, are referred to as "naturalness_score" (FIG. 5C, line 22) and "length_appropriateness_score" (FIG. 5D, line 10). These procedures are described in the pseudocode comments (FIG. 5C, lines 14-20 and FIG. 5D, lines 1-8).

Prior to calling query_score, the snippet to be scored can be "mapped" according to which parts of the snippet assert which pinnacle concepts. Such classification information can already be cached with each snippet during the indexing phase as described in section 3.1 ("Indexing"). Alternatively, such classification information can be determined during the concept-based ranking phase (see FIG. 5C, lines 7-10). Such classification information can be determined by invoking "sentence_classify" on each sentence of each snippet. As discussed above in section 2 ("Concept-Based Classification"), sentence_classify receives a sentence "S_curr" as input and returns a parse structure whose nodes are coded with pinnacle concept-value pairs. The level of sentence structural information represented by each node can be, for example, a lexical unit. Each pinnacle concept-value pair "p" specifies a reference level with which a pinnacle concept (indicated by "p") is asserted by, at least, the sub-unit of S_curr represented by the node to which "p" is attached.

4.2. Scoring a Snippet Relative to a Query

An example operation of query_score is depicted in the pseudocode of FIGS. 7A and 7B. The query_score of FIGS. 7A and 7B depicts concept-based snippet scoring where the input query, against which the snippet to be score matched, is comprised of a single page of query terms. An example, single page, query is shown in FIG. 8B. The techniques of concept-based snippet scoring, presented in this section, can be applied (with the appropriate changes) to any other suitable form of input query (e.g., an input query comprised of multiple pages).

query_score iterates over each query term, "QT_curr," of input_query (lines 3-4), and assigns each query term a value (called a "coefficient") that depends upon the results of concept-based matching between QT_curr and the snippet (called "snippet2score") that receives a concept-based score. A process for assigning a coefficient value to a query term is shown in the pseudocode as six "Rules." FIG. 7A, line 9 to FIG. 7B, line 12. Each time query_score is invoked on a pair of data items (i.e., upon a snippet and a query), any coefficient values, assigned from prior invocations of query_score, are ignored.

The rules of query_score are explained below in conjunction with the example input_query 801 of FIG. 8B and the example "snippet2score" 1100 of FIG. 11.

Example snippet 1100 is presented in diagrammatic form. It is shown as being composed of five sentences, 1110 to 1114, with each sentence represented as a rectangular region. Within each sentence, only those words, that match a keyword of query 801, are shown. Those words, that are in a region of snippet 1100 that has been classified as indicating "Good" are enclosed in a dashed outline (i.e., the word "last" in sentence 1112). Those words, that are in a region of snippet 1100 that has been classified as indicating "Bad" are enclosed in a solid outline (i.e., the words "out of power" in sentence 1111 and the words "hand-held" in sentence 1114). Those words, that are in a region of snippet 1100 that has been classified as not indicating any pinnacle concept are not enclosed in an outline (i.e., the word "battery" in sentence 1110).

query_score, when iterating over the query terms of query "input_query," can skip each query term where the "requirement status" is "excluded" since such terms can have no match between a concept property of the query term and a concept indicated in a snippet.

In presenting the example query of FIG. 8B, it will be assumed that the query terms are iterated over in numerical order, from 820 to 823. Query terms 820 to 823 will also be referred to as QT820 to QT823.

For query term 820, its keyword "battery" matches the word "battery" of sentence 1110. Further, query term 820 specifies, for its concept property, that a matching sub-unit of a snippet need not indicate any pinnacle concept (specified by "concept property" being "none" for query term 820). Query term 820, and "battery" of sentence 1110, satisfy Rule 2 (FIG. 7A, lines 15-18). Therefore, query term 820 is assigned a coefficient value of 1.0. In terms of the pseudocode, we can say that QT820 (coefficient)=1.0 (see pseudocode line 18). In general, Rule 2 applies when the query term specifies no particular concept and a keyword of the query term has at least one match in the snippet.

For query term 821, its keyword phrase "out of power" matches the words "out of power" of sentence 1111. Further, query term 821 specifies, for its concept property, that a matching sub-unit of a snippet is preferred if it indicates the pinnacle concept "Bad." The solid box around "out of power" indicates that this sub-unit of sentence 1111 has been classified as indicating "Bad." Query term 821 and "out of power" of sentence 1111 satisfy Rule 1 (FIG. 7A, lines 9-13). Therefore, in terms of the pseudocode, QT821 (coefficient)=1.0 (see pseudocode line 13). In general, Rule 1 applies when the query term specifies a pinnacle concept and a keyword of the query term has at least one match in the snippet at a location that references the same pinnacle concept.

In a first alternative scenario, if the words "out of power" of sentence 1111 did not indicate any concept, then query term 821 and "out of power" of sentence 1111 would satisfy Rule 3 (FIG. 7A, lines 20-24). In this case, because the query term has a preference for the concept "Bad," but the matched snippet text is concept-neutral, QT821 (coefficient) drops from 1.0 to 0.1 (see pseudocode line 24). In general, Rule 3 applies when the query term specifies a pinnacle concept and a keyword of the query term has at least one match in the snippet at a location that indicates no pinnacle concept.

In a second alternative scenario, if the words "out of power" of sentence 1111 indicate "Good," then query term 821 and "out of power" of sentence 1111 would satisfy Rule 5 (FIG. 7B, lines 1-7). In this case, because the query term has a preference for the concept "Bad," but the matched snippet text is concept-opposite, QT821 (coefficient) drops from 0.1 (of the first alternative scenario) to 0.001 (see pseudocode line 7). In general, Rule 5 applies when the query term specifies a pinnacle concept and a keyword of the query term has at least one match in the snippet at a location that indicates the opposite (or correlative) pinnacle concept.

Query term 822, and its match to the word "last" of sentence 1112, operates in essentially the same way described above for query term 821 and its match to the words "out of power" of sentence 1111: the query term specifies a concept property and the matching sub-unit of the snippet indicates the same pinnacle concept causing Rule 1 to apply. The difference is that the shared pinnacle concept, for the query term and the matching snippet text, is "Good" rather than "Bad."

Query term 823, and its match to the word "hand-held" of sentence 1114, operates in a way similar to that described above for query term 820 and its match to the word "battery" of sentence 1110. The fact that "hand-held" indicates "Bad" is irrelevant to the application of Rule 2 and QT823 (coefficient)=1.0. However, because QT823 has a requirement status of Optional, Rule 6 (FIG. 7B, lines 9-12) also is executed, which guarantees that absent Optional query terms do not receive a score of zero. In this case, QT823 happens to be present, and the execution of Rule 6 leaves the score unchanged: 0.001+1*0.999=1.0.

In a third alternative scenario, however, if none of the keywords of query term 823 matched in snippet 1100, then Rule 4 and Rule 6 both apply and QT823 (coefficient) drops from 1.0 to 0.001:0.001+1*0.0=0.001. In general, Rule 4 applies when no keyword term of the query term matches anywhere in the snippet.

Once each query term has been assigned a coefficient value, a single value (called a query score or "QS"), to express the level of concept-property to snippet matching, can be determined. An example procedure for determining the QS value is depicted in FIG. 7B, lines 16-22. As can be seen, the pseudocode computes the product of the coefficient values.

For query page 801 and snippet 1100 discussed above, not considering any of the alternative scenarios discussed, the QS is (1*1*1*1)=1. Note that if just the third alternative scenario is considered, where optional query term 823 does not occur in snippet 1100, the QS score for snippet 1100 is (1*1*1*0.001)=0.001. Thus the lack of matching an optional query term will not necessarily prevent a snippet from being included in the search results, but it will lower its ranking considerably.

The particular coefficient values presented in FIGS. 7A-7B, for Rules 1-6, are simply exemplary and other values can be assigned, depending upon the application.

For the example of FIGS. 7A-7B, each coefficient value is chosen to differ from all other coefficient values by at least an order of magnitude. Snippet scores can therefore differ by orders of magnitude even if the snippets differ only slightly in content. However, when results are sorted (or ranked) according to score, items with drastically different scores can still appear (in an output listing to a user) close together if there are few other items with intermediate scores.

Rules 1-5, of FIGS. 7A-7B, are an example of assigning coefficient values, to query-term-to-snippet matches, that are larger if the match quality is greater. If more than one of Rules 1-5 is found to apply to a particular pair of query term and snippet, the Rule that assigns the largest coefficient value to the query term can be chosen.

In addition to the Rules shown in FIGS. 7A-7B, additional factors can be taken into account in order to further adjust the particular coefficient values assigned. For example, the coefficient assigned to a query term can be adjusted downward if the keywords of the query term, that match in the current snippet for which a QS score is being determined, are relatively commonly occurring words.

5. FURTHER DETAILS

5.1. Pinnacle Concepts

5.1.1. Other Pinnacle Concepts

Two pinnacle concepts, whose identification has been focused-on herein, are "Good" and "Bad." However, the techniques presented herein can be applied to other pinnacle concepts. Other example pinnacle concepts are "Need" and "Purchase."

The concept "Need" occurs when a unit of natural language discourse refers to a situation whose characterization, as either good or bad, depends upon a condition. If the condition is satisfied, a good situation is realized, while if the condition is not satisfied, a bad situation occurs. As with "Good" and "Bad," "Need" can also be used as the organizing concept for a CBDB. A CBDB ("Need") can be created, for example, by searching the Internet for all web pages that refer to the concept "Need." Snippets, surrounding such references, can be extracted from the web content and accumulated in CBDB ("Need"). If a user conducts a search of CBDB ("Need"), with keywords to focus on the particular needer or thing needed, highly relevant snippets can be identified.

The pinnacle concept "Purchase" can also be used as the organizing concept for a CBDB. The concept "Purchase" occurs when a unit of natural language discourse refers to the concept of making a purchase. "Purchase" can be used as the organizing concept for a CBDB. A CBDB ("Purchase") can be created, for example, by searching the Internet for all web pages that refer to the concept "Purchase." Snippets, surrounding such references, can be extracted from the web content and accumulated in CBDB ("Purchase"). If a user conducts a search of CBDB ("Purchase"), with keywords to focus on the particular item to be bought or sold, highly relevant snippets can be identified.

5.1.2. Multiple Pinnacle Concept Concept-Based Search

For some search topics, the combination of searching according to a single pinnacle concept, along with further focusing by keywords, can be insufficient. It can be useful, for example, to be able to search according to a combination of two or more pinnacle concepts (referred to herein as a "multi-concept concept-based search" or MC concept-based search).

For example, when searching the "Good" and "Bad" databases, on technology-related issues, the following pinnacle concepts can be useful adjuncts (the following pinnacle concepts are presented as correlative pairs):
Much/Little
Large/Small
Fast/Slow
High/Low Each of the above-listed pinnacle concepts is frequently used in connection with describing the attributes of a technology.

Additional pinnacle concepts can be made searchable, in a CBDB, as follows. When a snippet "snpt" is added to a CBDB, in addition to indexing "snpt" according to its keywords, it can also be indexed according to the pinnacle concepts referenced. During keyword-based searching of the CBDB, in addition to having the capability to express query terms that search by keyword, there is the capability to express query terms that search by indexed pinnacle concepts.

Pinnacle concepts can also be made searchable, in a CBDB, as follows. Once a list of snippets "snpt_list" has been produced, by the search of a CBDB by keyword, "snpt_list" can be searched for those snippets that refer to an additional pinnacle concept or concepts. This can be accomplished by applying a classification procedure, like "sentence_classify," to one or more sentences of each snippet of "snpt_list." sentence_classify can be augmented to identify, in addition to organizing concepts, references to the additional pinnacle concepts. Those snippets, that refer to the additional pinnacle concept or concepts, can be returned as a search result to the user.

5.1.3. Deriving a Concept-Feature Database

Given any pinnacle concept "pinnacle_x," this section describes four methods for deriving a concept feature set.

The first method can be referred to as "machine learning." In this approach, a person is provided a large number of UNLDs (e.g., sentences). With respect to "pinnacle_x," the person marks each UNLD "u" as either a "hit" (i.e., "pinnacle_x" is used or expressed in "u") or a "miss" (i.e., "pinnacle_x" is not used or expressed in "u"). Statistical analysis is performed, on the marked UNLDs, to determine which features correlate with whether a UNLD is a "hit" or "miss." A problem with the machine learning approach, however, is that performance of a reliable statistical analysis, even on features that are relatively frequent, requires the person to mark an extremely large corpus of UNLDs. For example, the 5000th most common word in English only occurs, roughly, 20 times for each one million words of text. Thus, even if a person marks a corpus of sentences that is comprised of one million words, the 5000th most common word will only have occurred 20 times. This kind of low frequency of occurrence can lead to spurious correlations and, therefore, to unreliable or incorrect linguistic features. Machine learning can also produce spurious correlations because the machine learning procedures are able to apply no contextual knowledge to the corpus that is being analyzed.

In the second method, a person reads various UNLDs and identifies specific linguistic features (e.g., lexical units) that, in the subjective opinion of that person, indicate a reference to the pinnacle concept for which a concept feature set is sought. To each linguistic feature identified, the person can also assigns a numeric "level of assurance" value that quantifies how likely it is, in the subjective opinion of that person, that the pinnacle concept at issue is actually being expressed or used. An advantage of the second method, over the first method, is that a very large input corpus does not need to be analyzed before low frequency linguistic features are identified. A disadvantage of the second method, with respect to the first method, is that it relies on subjective judgment rather than on objective analysis of empirical data.

In the third method, a person attempts to recall a list of linguistic features that, in the subjective opinion of that person, indicate the pinnacle concept at issue, without such recall being elicited or aided through examination of an input corpus. An advantage of this method is that an initial list of linguistic features can be assembled very quickly, since no input corpus need be analyzed. A disadvantage of this approach is its reliance on unelicited recall which is known, in general, to be far less complete than elicited recall. Another disadvantage of this approach is its reliance on subjective judgment.

In the fourth method a person starts with an initial list of linguistic features and then utilizes one or more known language-reference tools to find similar additional linguistic features. The person can select appropriate items, from the list of similar additional linguistic features and assign, to such selected linguistic features, a numeric "level of assurance" value. Example known language-reference tools include the following: a dictionary, a thesaurus and an ontology. A brief description, of how each of these language-reference tools can be used, is as follows.

The definitions of a dictionary can be searched for those that contain linguistic features of the initial list. Each word of the dictionary, whose definition contains a linguistic feature of the initial list, is a likely candidate for addition to concept feature set of the pinnacle concept at issue.

A thesaurus can provide, for each linguistic feature of the initial list, a list of synonyms. A disadvantage of a thesaurus, however, is that a linguistic feature can be included in a concept feature set for many other reasons than synonymy. For example, a linguistic feature that expresses a pinnacle concept weakly should be in the same concept feature set with a linguistic feature that expresses the same pinnacle concept strongly. For example, if the pinnacle concept is "Good," both "nice" and "fantastic" should be included. However, words that vary greatly, in the strength with which they express a particular pinnacle concept, are not synonyms.

The term "ontology," as used herein, refers to a body of knowledge that is intended to be a complete description of some well-defined subset of the world. An example type of ontology is encyclopedias. "WordNet" is an online ontology provided by the Cognitive Science Laboratory, Princeton University, Princeton, N.J., U.S.A. Given a lexical unit of the English language, WordNet can currently provide a list that includes: synonyms, antonyms, hypernyms, hyponyms, meronyms and holonyms. Other than its richer potential output, in terms of the additional word classes it will consider, WordNet can be used in a similar manner to that of a thesaurus.

5.2. Snippet Formation

As discussed above (see, for example, section 3.1 on "Indexing"), a snippet can be formed during the process of "scanning" a document, sentence-by-sentence, and applying a classification process to each sentence scanned to determine the pinnacle concepts referred to. If a pinnacle concept is identified in a sentence "s," for which snippet formation is appropriate (e.g., the pinnacle concept is the organizing concept for a CBDB), a snippet can be formed around "s" to provide sufficient context such that the snippet is understandable apart from its source document. A specific issue to consider, in determining sufficient context for "s," is pronoun resolution. In the context of snippet size determination, the pronoun resolution problem can be stated as follows: if a pronoun occurs in "s," it is desirable that the noun for it appear in the snippet context that surrounds "s." The larger the snippet size, the more likely it is that all pronouns of "s" will be resolved. Counterbalancing pronoun resolution, however, is the need for a snippet to be small enough to permit fast comprehension by the searcher.

In the search areas described above in 1.3.1 ("New Uses For An Existing Technology") and 1.3.2 ("Finding A Technology To Address A Problem"), a snippet size of five sentences has been experimentally determined to be desirable. An example five sentence snippet 1100 is shown in FIG. 11. Snippet 1100 can be formed because an organizing concept is found to be referred to by sentence 1112 in a document "D." Once sentence 1112 is identified by a classification procedure, two sentence before (i.e., sentences 1110 and 1111) and two sentences after (i.e., sentences 1113 and 1114) can be added to snippet 1100 to provide sufficient context for sentence 1112. If, however, sentence 1112 is at the beginning of "D," the sub-unit of the snippet corresponding to sentences 1110 and 1111 cannot be formed. Similarly, if sentence 1112 is at the end of "D," the sub-unit of the snippet corresponding to sentences 1113 and 1114 cannot be formed.

5.3. Production Environment

FIG. 3 depicts an example computer system design in which the techniques described herein can be applied.

Cloud 330 represents data available via the Internet. Computer 310 can execute a web crawling program, such as Heritrix, that finds appropriate web pages and collects them in an input database 300. An alternative, or additional, route for collecting input database 300 is to use user-supplied data 300. For example, as discussed above in section 1.3.1 ("New Uses For An Existing Technology"), such user-supplied data 300 can include the following: CD-ROMs, record-oriented databases (relational or otherwise) and a company intranet. A computer 311 can be used to process (e.g., reformat) such user-supplied data 300 for input database 300.

Computer 312 can perform what is referred to in section 1.2.2 ("Two-Phase Approach") as the indexing phase. The indexing phase scans the input database for sentences that refer to an organizing concept (through a classification procedure like "sentence_classify"), produces a snippet around each such sentence and adds the snippet to the appropriate concept-based database. FIG. 3 depicts an example concept-based database (CBDB) 301. In a system designed for technology-related searching, at least two such CBDBs could be produced: one with "Good" as the organizing concept and the other with "Bad" as the organizing concept.

Databases 320 and 321 represent, respectively, stable "snapshots" of databases 300 and 301. Databases 320 and 321 can provide stable databases that are available to service search queries entered by a user at a user computer 333. Such user query can travel over the Internet (indicated by cloud 332) to a web interfacing computer 314 that can also run a firewall program. Computer 313 can receive the user query and perform what is referred to in section 1.2.2 ("Two-Phase Approach") as the search phase. The search phase can use a keyword-based search engine to search CBDB 321. The results of the search phase can be stored in a database 302 that is private to the individual user. When a snippet of interest is found in the search results, input database 320 is available to the user to provide the full document from which the snippet was obtained.

5.4. Example Negation Propagation

FIGS. 12A-12E depicts five similar sentences, labeled 1200-1204, that are intended to be illustrative of how occurrences of the negation Quantifier "Negation," in a sentence, can interact at governing nodes. This section applies the following sub-sections of section 2 ("Concept-Based Classification"): 2.2.2 ("Populate Parse Structure"), 2.2.3 ("Quantifier Propagation"), 2.2.4.2.1 ("Thresholding"), 2.2.4.2.2 ("Sum Values On Per-Concept Basis") and 2.2.4.2.3 ("Apply PLQ").

Sentence 1200 can be called the "base" sentence, of the group of five sentences, and sentences 1201-1204 are the result of adding the word "no" or "never," at different locations, to sentence 1200. Sentence 1200 is comprised of the following two independent clauses: "storms cancel games" and "organizers plan accordingly." These independent clauses are referred to as, respectively, the "storm clause" and the "organizers clause." The two independent clauses are connected by the word "but," which is an example coordinating conjunction.

A node-oriented parse structure of sentence 1200 is not shown (as was shown for sentence 1000 in FIGS. 10C to 10L). However, one can appreciate that the link between a node for "but" and a node of the storm clause is not of a type over which the "Negation" Quantifier (or any other Quantifier) can propagate (see section 2.2.3 "Quantifier Propagation"). Similarly, the link between a node for "but" and a node of the organizers clause is not of a type over which the "Negation" Quantifier (or any other Quantifier) can propagate. For the storm clause, the node for "cancel" is the governing node (because it is the verb of the clause) and, for the organizers clause, the node for "plan" is the governing node (because it is the verb of the clause).

Propagation, of just the "Negation" Quantifier, can proceed as follows for sentence 1200. For the storm clause, only the lexical unit "cancel" refers to the "Negation" Quantifier. A concept-value pair "p1," for the concept "Negation," can be initially populated at the node for "cancel" (such population can be performed in accordance with section 2.2.2 "Populate Parse Structure"). Since "p1" is already at the governing node, it propagates no further (when such propagation is performed in accordance with section 2.2.3 "Quantifier Propagation"). Assuming the value portion of "p1" is thresholded to 1.0 (in accordance with section 2.2.4.2.1 "Thresholding") the total value for "Negation" remains at 1.0 after summing (in accordance with section 2.2.4.2.2 "Sum Values On Per-Concept Basis") all "Negation" values at the node for "cancel." After applying 1.0 as the exponent for −1.0 (in accordance with section 2.2.4.2.3 "Apply PLQ") a value of −1.0 is determined for "Negation" concept. The value of −1.0 means that the storm clause, within the context of sentence 1200, asserts a single negative. This interpretation of sentence 1200 is, in fact, correct since the sentence does assert that games do not take place. A similar analysis does not need to be performed for the organizers clause of sentence 1200 since it has no lexical unit that refers to the "Negation" Quantifier. Therefore, the organizers clause asserts that planning does take place.

Propagation, of just the "Negation" Quantifier, can proceed as follows for sentence 1201. As with sentence 1200, a concept-value pair "p1," for the concept "Negation," can be initially populated at the node for "cancel." Unlike sentence 1200, however, the lexical unit "no" also refers to the "Negation" Quantifier. A concept-value pair "p2," also for the concept "Negation," is also initially populated at a node for "no." The concept-value pair "p2" can propagate to the node for "games" (where we shall refer to it as "p3") since "no" modifies "games." The concept-value pair "p3" can then propagate to the node for "cancel" (where we shall refer to it as "p4") since "games" is the patient of the verb "cancel." Thus, as a result of propagation, there will be two concept-value pairs, for the concept "Negation," at the node for "cancel": "p1" and "p4." Assuming the values of both "p1" and "p4" threshold to 1.0, the presence of "p1" and "p4" at a single node indicate that the storm clause of sentence 1201 asserts a double negative. In terms of sections 2.2.4.2.2 ("Sum Values On Per-Concept Basis") and 2.2.4.2.3 ("Apply PLQ"), this double negative is determined as follows. Summing the values of "p1" and "p4" produces a "Negation" value of 2.0 that is applied as an exponent 2.0 to the value −1.0. Thus, the double negative is represented as $(-1.0)^{2.0}$, or simply 1.0. This is, in fact, a correct interpretation since the storm clause, within the context of sentence 1201, asserts that games do take place. A similar analysis does not need to be performed for the organizers clause of sentence 1201 since it has no lexical unit that refers to the "Negation" Quantifier. Therefore, the organizers clause asserts that planning does take place.

Propagation, of just the "Negation" Quantifier, can proceed as follows for sentence 1202. A concept-value pair "p1," for the concept "Negation," can be initially populated at the node for "cancel." A concept-value pair "p2," also for the concept "Negation," is also initially populated at a node for "no." The concept-value pair "p2" can propagate to the node for "storms" (where we shall refer to it as "p3") since "no" modifies "storms." The concept-value pair "p3" can then propagate to the node for "cancel" (where we shall refer to it as "p4") since "storms" is the agent of the verb "cancel." Thus the end result of the propagation is the same as for sentence 1201: there will be the two concept-value pairs "p1" and "p4," for the concept "Negation," at the node for "cancel." Assuming the values of both "p1" and "p4" threshold to 1.0, the presence of "p1" and "p4" at a single node indicate that the storm clause of sentence 1202 asserts a double negative (i.e., the clause asserts that games do take place). A similar analysis does not need to be performed for the organizers clause of sentence 1202 since it has no lexical unit that refers to the "Negation" Quantifier. Therefore, the organizers clause asserts that planning does take place.

Propagation, of just the "Negation" Quantifier, can proceed as follows for sentence 1203. A concept-value pair "p1," for the concept "Negation," can be initially populated at the node for "cancel." A concept-value pair "p2," also for the concept "Negation," is also initially populated at a node for "never." The concept-value pair "p2" can propagate to the node for "cancel" (where we shall refer to it as "p3") since "never" modifies "cancel." Thus the end result of the propagation is the same as for sentences 1201 and 1202: there are two concept-value pairs, for the concept "Negation," at the node for "cancel." Assuming the values of both concept-value pairs threshold to 1.0, a determination is made that the storm clause of sentence 1203 asserts a double negative (i.e., the clause asserts that games do take place). A similar analysis does not need to be performed for the organizers clause of sentence 1203 since it has no lexical unit that refers to the "Negation" Quantifier. Therefore, the organizers clause asserts that planning does take place.

Propagation, of just the "Negation" Quantifier, can proceed as follows for sentence 1204. The propagation of "Negation" in the storm clause is the same as described above for sentence 1200. Therefore, the storm clause asserts that games do not take place. The propagation of "Negation," for the organizers clause, is as follows. a concept-value pair "p2," for the concept "Negation," is initially populated at a node for "never." The concept-value pair "p2" can propagate to the node for "plan" (where we shall refer to it as "p3") since "never" modifies "plan." Assuming the value of "p3" thresholds to 1.0, it can be concluded that the organizers clause, within the context of sentence 1204, asserts a single negative. This interpretation of sentence 1204 is, in fact, correct since the sentence does assert that planning does not take place.

6. GLOSSARY OF SELECTED TERMS

Classification: Identification of one or more pinnacle concepts as asserted by a unit of natural language discourse or UNLD. A typical UNLD is a sentence. For each such pinnacle concept asserted, a value can be assigned indicating the reference level of such reference. The particular sub-units of the UNLD, responsible for each pinnacle concept asserted, can be identified. An example sub-unit level, at which to identify such responsibility, is the lexical unit level.

Concept-based database (CBDB): A database of snippets, where all snippets of the database have been determined to refer to a pinnacle concept that is called the "organizing concept" of the database.

Concept-value pair: Refers not only to a pairwise data representation, but also to any representation that is functionally equivalent to a pairwise data representation. For example, consider a sentence whose parse structure uses a matrix data organization. In this case each row can correspond to a structural unit of the sentence (e.g., a lexical unit) and each column can correspond to a pinnacle concept. Each cell of the matrix can function as a concept-value pair since it can be assigned a value indicative of whether the concept represented by the cell's column is referred-to by the structural unit represented by the cell's row.

CFDB: Concept Feature Database. Contains a set of linguistic features which, if found in a UNLD, indicate that the UNLD refers to at least one pinnacle concept.

Computer-accessible content: any type of content that is accessible via computer. This includes database content as well as streaming sources of data.

Database: any corpus of data that is accessible by computer.

Keyword-based search: The process by which a UNLD of interest can be identified within a larger database based on the presence or absence of pre-selected query terms within that UNLD. In the simplest implementation, the query is an exact word or phrase. One elaboration allows for each query to be a pattern that specifies a set of possible matching words or phrases. One common manner of elaboration is to allow a word to be substituted by any of its grammatical forms (e.g., "written," "writes," and "wrote" all matching a query of "write"). Another common manner of elaboration is to allow expressions of queries linked together with the operators of standard or nonstandard logics, where the expression is deemed to be present if each internal term is interpreted as a subquery, and the expression, applied to those subqueries evaluates to true.

Lexical unit: A sequence of one or more words that has at least one meaning "m" for which the sequence operates as an indivisible unit. Meaning "m" cannot be derived from the sequence through any normal composition of the meanings of the sequence's constituent words. For example, "The White House" is not simply any house which happens to be white, and "dry ice" is not simply ice that happens to be dry.

Parse structure: Any data representation that specifies a UNLD as a division into parts and that maintains relationship information between those parts. Example organizational schemes, for the parts of a parse structure, can include any of the following: matrix, linear ordering, tree structure, directed acyclic graph or network.

Propagation: Refers to the transfer or copying of data, that has been associated with certain parts of a data structure, to other parts of that data structure.

Pseudo-code: The pseudo-code presented herein is loosely based on the C programming language. The C programming language is described in such texts as "A Book on C," by A. Kelley and I. Pohl, Benjamin Cummings Pub. Co., Third Edition, 1995, ISBN 0-8053-1677-9, herein incorporated by reference in its entirety.

Record: Any representation of data that is recognized, for the database of interest, as a discretely accessible unit.

UNLD: Refers to a "unit of natural language discourse unit." The term "UNLD" can be used to refer to any unit of a natural language discourse. For example, a UNLD can refer to a unit that is of arbitrary length or that is not associated with any general linguistic structure.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for assigning a score for ranking a record, given the record and a query, comprising:

obtaining, performed at least in part with a configuration of computing hardware and programmable memory, the record by searching with the query a database organized according to at least a first pinnacle concept, where identification of a concept as the first pinnacle concept indicates that the concept is not a plains concept;

identifying, performed at least in part with a configuration of computing hardware and programmable memory, a first query term of the query;

identifying, performed at least in part with a configuration of computing hardware and programmable memory, the first pinnacle concept as associated with the first query term;

identifying, performed at least in part with a configuration of computing hardware and programmable memory, a first set of one or more sub-units of the record, wherein each sub-unit contains at least one occurrence of the first query term;

determining, performed at least in part with a configuration of computing hardware and programmable memory, for each sub-unit of the first set of sub-units, whether the first pinnacle concept is asserted; and assigning, performed at least in part with a configuration of computing hardware and programmable memory, a first score to the first query term that is larger when the first pinnacle concept is asserted by at least one sub-unit of the first set of sub-units than when the first pinnacle concept is not asserted.

2. A system, for assigning a score for ranking a record, given the record and a query, comprising:

one or more processors and programmable memory, wherein the system is configured:

to accomplish obtaining the record by searching with the query a database organized according to at least a first pinnacle concept, where identification of a concept as the first pinnacle concept indicates that the concept is not a plains concept;

to accomplish identifying a first query term of the query;

to accomplish identifying the first pinnacle concept as associated with the first query term;

to accomplish identifying a first set of one or more sub-units of the record, wherein each sub-unit contains at least one occurrence of the first query term;

to accomplish determining for each sub-unit of the first set of sub-units, whether the first pinnacle concept is asserted; and to accomplish assigning a first score to the first query term that is larger when the first pinnacle concept is asserted by at least one sub-unit of the first set of sub-units than when the first pinnacle concept is not asserted.

* * * * *